United States Patent
Matsumura et al.

(10) Patent No.: US 6,855,768 B2
(45) Date of Patent: Feb. 15, 2005

(54) COATING COMPOSITION, COATING METHOD, AND COATED ARTICLE

(75) Inventors: Kazuyuki Matsumura, Gunma-ken (JP); Masaaki Yamaya, Gunma-ken (JP); Koichi Higuchi, Gunma-ken (JP); Muneo Kudo, Gunma-ken (JP); Yoshifumi Kato, Gunma-ken (JP); Takashi Komori, Kariya (JP); Toshihisa Shimo, Kariya (JP)

(73) Assignees: Shin-Etsu Chemical Co., Ltd., Tokyo (JP); Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 10/694,184

(22) Filed: Oct. 28, 2003

(65) Prior Publication Data

US 2004/0087711 A1 May 6, 2004

Related U.S. Application Data

(62) Division of application No. 09/773,887, filed on Feb. 2, 2001, now Pat. No. 6,677,047.

(30) Foreign Application Priority Data

| Feb. 4, 2000 | (JP) | ......................................... 2000-027713 |
| Feb. 4, 2000 | (JP) | ......................................... 2000-027719 |

(51) Int. Cl.[7] ............................................. C08F 130/08
(52) U.S. Cl. .................. 525/100; 525/102; 106/287.11
(58) Field of Search ...................... 106/287.11; 525/100, 525/102; 526/279

(56) References Cited

U.S. PATENT DOCUMENTS

| 4,043,953 A | * | 8/1977 | Chang et al. ................ 525/100 |
| 4,278,804 A |   | 7/1981 | Ashby et al. |
| 4,316,033 A |   | 2/1982 | Ching |
| 4,349,602 A |   | 9/1982 | Ching |
| 4,353,959 A |   | 10/1982 | Olson et al. |
| 5,250,359 A | * | 10/1993 | Funaki et al. ............... 428/447 |
| 5,356,995 A | * | 10/1994 | Valet et al. .................. 525/100 |
| 5,569,451 A |   | 10/1996 | Richard et al. |
| 5,610,257 A |   | 3/1997 | Richard et al. |
| 5,663,270 A |   | 9/1997 | Richard et al. |
| 5,980,851 A |   | 11/1999 | Suga et al. |
| 6,251,986 B1 | * | 6/2001 | Ide et al. ..................... 524/547 |
| 6,274,671 B1 |   | 8/2001 | Kageishi et al. |
| 6,372,355 B1 | * | 4/2002 | Noda et al. .................. 428/447 |

FOREIGN PATENT DOCUMENTS

| EP | 0475149 A2 | | 3/1992 |
| EP | 1036834 A1 | | 9/2000 |
| JP | 56-92059 | | 7/1981 |
| JP | 57-21476 | | 2/1982 |
| JP | 1-149878 | | 6/1989 |
| JP | 6-299132 | | 10/1994 |
| JP | 7-90184 | | 4/1995 |
| JP | 8-151415 | | 6/1996 |
| JP | 09286912 | | 11/1997 |
| JP | 9-286912 | | 11/1997 |
| JP | 10-25434 | | 1/1998 |
| JP | 2885669 | | 2/1999 |
| JP | 2885671 | | 2/1999 |
| JP | 2885672 | | 2/1999 |
| JP | 2001234072 | | 8/2001 |
| WO | 98/34991 | * | 8/1998 |
| WO | 9834991 | | 8/1998 |

OTHER PUBLICATIONS

English translation JP 09286912 Apr. 1997.
abstract JP 10265241 Oct. 1998.
abstract JP 2001234072 Aug. 2001.

* cited by examiner

*Primary Examiner*—Margaret G. Moore
(74) *Attorney, Agent, or Firm*—Birch, Stewart, Kolasch & Birch, LLP

(57) ABSTRACT

A coating composition comprising the reaction product of a benzotriazole compound having a polymerizable vinyl group and a hydroxyl group with a silane compound and/or a (partial) hydrolyzate thereof is applied to plastic substrates, typically polycarbonate resin substrates to form transparent coatings having improved mar, weather and chemical resistance.

8 Claims, No Drawings

COATING COMPOSITION, COATING METHOD, AND COATED ARTICLE

This is a Request for filing a divisional application under 37 C.F.R. §1.53(b) of prior application Ser. No. 09/773,887 filed on Feb. 2, 2001, now U.S. Pat. No. 6,677,047, the entire contents of which are hereby incorporated by reference.

This invention relates to coating compositions for forming mar and weather-resistant protective coatings on plastic substrates, typically polycarbonate resin substrates, a method for the surface protection of plastic substrates using the coating compositions, and coated articles having coatings thereof.

BACKGROUND OF THE INVENTION

As glazing substitutes, shatterproof or highly shatter resistant transparent materials have been widely utilized for these decades. For example, plastic substrates, especially polycarbonate resins have superior transparency, impact resistance and heat resistance and are currently used as structural members instead of glass in a variety of applications including building and vehicle windows and instrument covers.

The polycarbonate resins, however, are inferior to glass in surface properties such as mar resistance and weather resistance. It is desired to improve the surface properties of polycarbonate resin parts. Nowadays, polycarbonate resin parts for use as vehicle windows and acoustic barrier walls along highways are required to withstand more than 10 years of weathering.

Known means for improving the weather resistance of polycarbonate resin parts include the lamination of a weather resistant acrylic resin film on the surface of a polycarbonate resin substrate and the formation of a ultraviolet absorber-containing resin layer on the resin surface, for example, by co-extrusion.

For improving the mar resistance of polycarbonate resin parts, it is known to coat thermosetting resins such as polyorganosiloxanes and melamine resins and to coat photocurable resins such as polyfunctional acrylic resins.

As to the manufacture of transparent articles having both weather resistance and mar resistance, JP-A 56-92059 and JP-A 1-149878 disclose ultraviolet-absorbing transparent substrates having a primer layer loaded with a large amount of UV absorber added and a protective coating of colloidal silica-containing polysiloxane paint overlying the primer layer.

However, several problems arise with this approach. The addition of a large amount of UV absorber can adversely affect the adhesion to the substrate. During heat curing step, the UV absorber can volatilize off. On outdoor use over a long period of time, the UV absorber will gradually bleed out, causing whitening. From the mar resistance standpoint, it is impossible to add a large amount of UV absorber to the protective coating of colloidal silica-containing polysiloxane.

From these considerations, it was also attempted to fix a UV absorber by silyl modification. For example, JP-A 57-21476 discloses alkylcarbamyl addition products of alkoxysilyl or alkanoylsilyl. Also U.S. Pat. Nos. 4,316,033 and 4,349,602 disclose silyl addition products obtained by reacting benzotriazole compounds with halogenated allyl compounds in the presence of bases. These methods, however, involve complex steps and are uneconomical.

Further, in JP-A 9-286912, the reaction product of a (meth)acrylic acid derivative of benzotriazole with an amino group-containing silane compound is added to a room temperature curable composition for the purpose of imparting weather resistance. In Japanese Patent Nos. 2,885,669, 2,885,671, and 2,885,672, a silyl-modified UV absorber in the form of a reaction product resulting from addition reaction between a benzotriazole containing a polymerizable vinyl group and a silane or silicone compound containing a Si—H group is used in cosmetic compositions as the sunscreen agent.

These silyl-modified UV absorbers are advantageous in that because of the inclusion of alkoxysilyl groups which undergo condensation reaction during the heat curing step, the absorbers are fixed within the coating during the heat curing step so that the absorbers might not bleed out. Heretofore, coating compositions having such silyl-modified UV absorbers added thereto and capable of forming mar and weather-resistant coatings have not been proposed.

It is also known from JP-A 6-299132, 7-90184 and 10-25434 that a copolymer of a benzotriazole based UV absorbing vinyl monomer or a benzophenone based UV absorbing vinyl monomer with another vinyl monomer copolymerizable therewith is used in tackifier compositions, light and chemical-resistant synthetic resins, and powder paint resins for the purpose of improving weather resistance. However, the use of such UV absorbing copolymers in a primer or undercoat layer is unknown. Undesirably, the use of such UV absorbing copolymers adversely affects the adhesion to the substrate and to the protective coating of colloidal silica-containing polysiloxane paint to be applied on the primer layer.

Moreover, it is known from JP-A 8-151415 that a mixture of a benzotriazole based UV absorbing vinyl monomer or a benzophenone based UV absorbing vinyl monomer and another vinyl monomer copolymerizable therewith is used in coating compositions which are effective for forming protective coatings on surfaces of synthetic resins. Since these protective coatings are based on vinyl polymers, their mar resistance is limited.

SUMMARY OF THE INVENTION

An object of the invention is to provide a coating composition and method for forming a protective coating having improved mar and weather resistance. Another object is to provide a coated article having a mar and weather-resistant coating.

The inventors have found that the reaction product of a benzotriazole compound having a polymerizable vinyl group and a hydroxyl group with a silane compound and/or a (partial) hydrolyzate thereof and preferably the reaction product of a compound of the general formula (A) with an amino group-containing organoxysilane of the general formula (B) and/or a (partial) hydrolyzate thereof becomes an effective component in a coating composition.

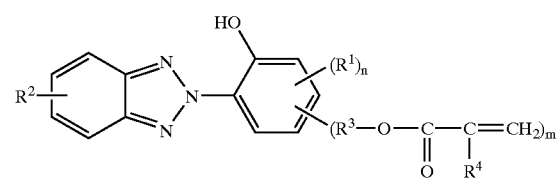

(A)

Herein $R^1$ and $R^2$ each are hydrogen, a halogen atom or alkyl group of 1 to 10 carbon atoms, $R^3$ is a substituted or unsubstituted divalent hydrocarbon group of 1 to 18 carbon atoms, $R^4$ is hydrogen or an alkyl group of 1 to 4 carbon atoms, n is an integer of 0 to 2, and m is an integer of 1 to 3.

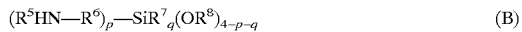

Herein $R^5$ is hydrogen or an alkyl group of 1 to 15 carbon atoms, $R^6$ is a divalent hydrocarbon group of 1 to 15 carbon atoms or an amino group-containing divalent hydrocarbon group of 1 to 15 carbon atoms, $R^7$ is an alkyl group or aryl group of 1 to 10 carbon atoms, $R^8$ is hydrogen or a monovalent organic group of 1 to 10 carbon atoms, p is equal to 1 or 2, q is equal to 0 or 1, and p+q is equal to 1 or 2.

Studying a coating composition for improving the mar and weather resistance of molded parts of thermoplastic resins such as polycarbonate, the inventors have discovered that a silyl-modified benzotriazole compound is so compatible with other components in the coating composition due to the effect of silyl groups that the silyl-modified benzotriazole compound may be added in larger amounts, as compared with unmodified benzotriazole compounds. The silyl-modified benzotriazole compound, even when added in large amounts, does not exacerbate the adhesion to the substrate or to the primer layer.

It has been found that outstanding weather resistance is established because the UV absorber can be loaded in large amounts and does not bleed out due to the fixation effect of silyl groups.

Also the inventors have found that the above-described problems can be overcome by a primer coating composition using an organic copolymer comprising (A) a benzotriazole base UV absorbing vinyl monomer, (B) a vinyl monomer containing an alkoxysilyl group, and (C) another monomer copolymerizable therewith, the vinyl monomer containing an alkoxysilyl group accounting for 0.1 to 50% by weight of the copolymer. Preferably an acrylic monomer having a cyclic hindered amine base photo-stabilizing group is used as the other monomer (C) in an amount of 0.1 to 10% by weight of the copolymer. The primer coating composition may further contain, per 100 parts by weight of the organic copolymer, 0.1 to 50 parts by weight a compound containing a nitrogen atom and an alkoxysilyl group in one molecule.

The inventors sought for a primer coating composition capable of improving the adhesion and weather resistance of molded parts of thermoplastic resins such as polycarbonate which are subsequently coated with an organopolysiloxane coating. When the above organic copolymer, in which benzotriazole base UV absorbing groups are fixed to the polymer backbone through chemical bonds, is used in the primer coating composition, the organic copolymer does not migrate to the surface, eliminates the whitening phenomenon of outer appearance, is not dissolved in water and solvents. The initial loading of the organic copolymer is retained over a long period of time, and the UV absorbing effect declines little with the lapse of time. Even on heat curing treatment at elevated temperature, the UV absorber does not volatilize off the coating. The copolymer is so compatible with other components in the primer coating composition that a large amount of the copolymer may be added without detracting from the transparency and adhesion of the primer coating composition to the substrate or the protective coating.

Further, since the vinyl monomer containing an alkoxysilyl group is used, alkoxysilyl groups are introduced into the primer coating layer to provide the primer coating layer with a reactivity with a protective coating layer to be applied thereon, thereby improving adhesion. This, combined with crosslinking among alkoxysilyl groups, contributes to improvements in heat resistance and durability.

When a compound containing a nitrogen atom and an alkoxysilyl group in one molecule, preferably a compound containing at least one nitrogen atom and at least two alkoxysilyl groups in one molecule is added to the organic copolymer, the primer coating layer is given water-proof adhesion. The compound crosslinks with alkoxysilyl groups in the organic copolymer to densify the primer coating and serves to fix the photo-stabilizer and other optional additives within the primer coating layer. The copolymer can introduce a large amount of UV absorbing groups in the primer coating layer while maintaining various useful properties, and eliminates the addition of or reduces the amount of a UV absorber in an organopolysiloxane base overcoat which UV absorber can be a detrimental factor to the mar resistance of the overcoat.

In one aspect, the invention provides a first coating composition as defined below.

1) A coating composition comprising the reaction product of a benzotriazole compound having a polymerizable vinyl group and a hydroxyl group with a silane compound and/or a (partial) hydrolyzate thereof.

2) The above coating composition wherein the reaction product and/or (partial) hydrolyzate is the reaction product obtained by effecting addition reaction between a compound of the general formula (A) and an amino group-containing organoxysilane of the general formula (B) and/or a (partial) hydrolyzate thereof.

3) The above coating composition comprising
(1) 0.1 to 100 parts by weight of the above reaction product and/or a (partial) hydrolyzate thereof, and
(2) 100 parts by weight of a silane compound of the general formula (C):

wherein $R^9$ is an alkyl group, aryl group, halogenated alkyl group, halogenated aryl group or alkenyl group of 1 to 10 carbon atoms, or an organic group having an epoxy, (meth) acryloxy, mercapto, amino or cyano group, $R^7$ is an alkyl group or aryl group of 1 to 10 carbon atoms, $R^8$ is hydrogen or a monovalent organic group of 1 to 10 carbon atoms, r and s each are equal to 0, 1 or 2, and r+s is equal to 0, 1 or 2, and/or a hydrolyzate thereof.

4) The above coating composition comprising a co-hydrolyzate obtained by subjecting to co-hydrolysis (1) 0.1 to 100 parts by weight of the above reaction product and/or (partial) hydrolyzate thereof, and (2) 100 parts by weight of the silane compound of the general formula (C) and/or hydrolyzate thereof.

5) The above coating composition further comprising (3) a microparticulate inorganic oxide containing at least one atom selected from titanium, cerium and zinc and capable of absorbing light having a wavelength of up to 400 nm.

6) The above coating composition further comprising (4) colloidal silica.

In another aspect, the invention provides a first primer coating composition as defined below.

7) A primer coating composition comprising
(1) 0.1 to 50 parts by weight of the above reaction product and/or (partial) hydrolyzate thereof, and
(5) 100 parts by weight of an organic copolymer of an acrylic and/or vinyl monomer containing an alkoxysilyl group with another monomer copolymerizable therewith, the acrylic and/or vinyl monomer containing an alkoxysilyl group accounting for 0.1 to 50% by weight of the copolymer.

8) The above primer coating composition further comprising 0.1 to 50 parts by weight of a compound containing a nitrogen atom and an alkoxysilyl group in one molecule.

9) The above primer coating composition wherein the compound containing a nitrogen atom and an alkoxysilyl group in one molecule is a compound containing at least one nitrogen atom and at least two alkoxysilyl groups in one molecule.

10) The above primer coating composition further comprising 0.1 to 10 parts by weight of a photo-stabilizer having at least one cyclic hindered amine structure in a molecule.

In a further aspect, the invention provides a second primer coating composition as defined below.

11) A primer coating composition comprising an alkoxy group-containing organic copolymer comprising (I) a UV-absorbing benzotriazole based vinyl monomer, (II) an alkoxysilyl group-containing vinyl monomer, and (III) another copolymerizable monomer, the alkoxysilyl group-containing vinyl monomer accounting for 0.1 to 50% by weight of the copolymer.

12) The above primer coating composition further comprising 0.1 to 10 parts by weight of a photo-stabilizer having at least one cyclic hindered amine structure in a molecule, per 100 parts by weight of said organic copolymer.

13) The above primer coating composition wherein said copolymer contains 0.1 to 10% by weight of an acrylic monomer having a cyclic hindered amine base photo-stabilizing group as the other monomer (III).

14) The above primer coating composition further comprising 0.1 to 50 parts by weight of a compound containing a nitrogen atom and an alkoxysilyl group in one molecule, per 100 parts by weight of said organic copolymer.

15) The above primer coating composition wherein the compound containing a nitrogen atom and an alkoxysilyl group in one molecule is a compound containing at least one nitrogen atom and at least two alkoxysilyl groups in one molecule.

In a still further aspect, the invention provides a coating method as defined below.

16) A method for providing a plastic substrate with a weather resistant, abrasion resistant coating, comprising the steps of:

(i) applying an organic solvent solution of the first primer coating composition onto a plastic substrate, (ii) evaporating the organic solvent and curing the primer coating, (iii) applying the first coating composition onto the primer coating, and (iv) heating the coating of the first coating composition for curing.

17) A method for providing a plastic substrate with a weather and abrasion-resistant coating, comprising the steps of:

(i) applying an organic solvent solution of the first primer coating composition onto a plastic substrate, (ii) evaporating the organic solvent and curing the primer coating, (iii) applying a colloidal silica-laden organopolysiloxane composition onto the primer coat, said organopolysiloxane composition comprising a hydrolyzate or co-hydrolyzate of an organoxysilane of the following general formula (D):

wherein $R^{14}$ is selected from the class consisting of a alkyl group, aryl group, halogenated alkyl group, halogenated aryl group and alkenyl group of 1 to 10 carbon atoms, and an organic group having an epoxy, (meth)acryloxy, mercapto, amino or cyano group, $R^{15}$ is hydrogen or a monovalent organic group of 1 to 10 carbon atoms, and x is equal to 0, 1 or 2, and colloidal silica, and (iv) heating the coating of the organopolysiloxane composition for curing.

18) A method for coating a plastic substrate with a weather and abrasion-resistant coating, comprising the steps of:

(i) applying an organic solvent solution of the second primer coating composition onto a plastic substrate, (ii) evaporating the organic solvent and curing the primer coating, (iii) applying an organopolysiloxane composition onto the primer coat, said organopolysiloxane composition comprising a hydrolyzate or co-hydrolyzate of an organoxysilane of the following general formula (D):

wherein $R^{14}$ is selected from the class consisting of a alkyl group, aryl group, halogenated alkyl group, halogenated aryl group and alkenyl group of 1 to 10 carbon atoms, and an organic group having an epoxy, (meth)acryloxy, mercapto, amino or cyano group, $R^{15}$ is hydrogen or an organic group of 1 to 10 carbon atoms, and x is equal to 0, 1 or 2, and (iv) heating the coating of the organopolysiloxane composition for curing.

19) The above method wherein said organopolysiloxane composition further contains colloidal silica.

Coated articles obtained by the above coating methods are also contemplated herein.

DESCRIPTION OF THE PREFERRED EMBODIMENT

In a first embodiment of the invention, the coating composition contains as an essential component the reaction product of a benzotriazole compound having a polymerizable vinyl group and a hydroxyl group with a silane compound and/or a (partial) hydrolyzate thereof. The reaction product results from addition reaction of the silane with the polymerizable vinyl group on the benzotriazole compound.

Any desired benzotriazole compound may be used herein as long as it has a polymerizable vinyl group and a hydroxyl group. In particular, compounds of the general formula (A) are preferred. On the other hand, any desired silane may be used as long as it has a functional group capable of reaction with the polymerizable vinyl group on the benzotriazole compound. Amino group-containing silanes and thiol group-containing silanes are preferred, and in particular, amino group-containing organoxysilanes of the general formula (B) are preferred.

Accordingly, in the first embodiment, the coating composition is preferably defined as comprising the reaction product of a benzotriazole compound of the general formula (A) with an amino group-containing silane of the general formula (B) and/or (partial) hydrolyzate. Specifically, the reaction product results from Michael addition reaction between polymerizable vinyl groups on the benzotriazole UV absorber (A) and amino groups on the amino group-containing organoalkoxysilane (B).

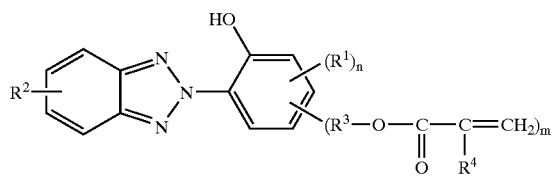

(A)

Herein R¹ and R² each are hydrogen, a halogen atom or alkyl group of 1 to 10 carbon atoms, R³ is a substituted or unsubstituted divalent hydrocarbon group of 1 to 18 carbon atoms, R⁴ is hydrogen or an alkyl group of 1 to 4 carbon atoms, n is an integer of 0 to 2, and m is an integer of 1 to 3.

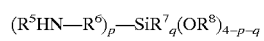

(B)

Herein R⁵ is hydrogen or an alkyl group of 1 to 15 carbon atoms, R⁶ is a divalent hydrocarbon group of 1 to 15 carbon atoms or an amino group-containing divalent hydrocarbon group of 1 to 15 carbon atoms, R⁷ is an alkyl group or aryl group of 1 to 10 carbon atoms, R⁸ is hydrogen or a monovalent organic group of 1 to 10 carbon atoms, p is equal to 1 or 2, q is equal to 0 or 1, and p+q is equal to 1 or 2.

In formula (A), R¹ and R² stand for hydrogen, halogen atoms such as chlorine, bromine and fluorine, and alkyl groups of 1 to 10 carbon atoms, preferably 1 to 4 carbon atoms, such as methyl, ethyl, propyl, isopropyl, butyl, isobutyl, tert-butyl, pentyl, hexyl, octyl and decyl. R³ stands for divalent hydrocarbon groups of 1 to 18 carbon atoms, preferably 1 to 4 carbon atoms, for example, alkylene groups such as methylene, ethylene, trimethylene, propylene, tetramethylene, 1,1-dimethyltetramethylene, butylene, octylene and decylene, and substituted alkylene groups in which some hydrogen atoms are replaced by halogen atoms, hydroxyl groups or the like. R⁴ is hydrogen or an alkyl group of 1 to 4 carbon atoms, such as methyl. The letter n is equal to 0, 1 or 2, and m is equal to 1, 2 or 3, and n+m is up to 4.

Illustrative, non-limiting, examples of the compound (A) are given below.

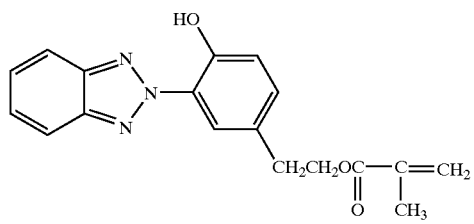

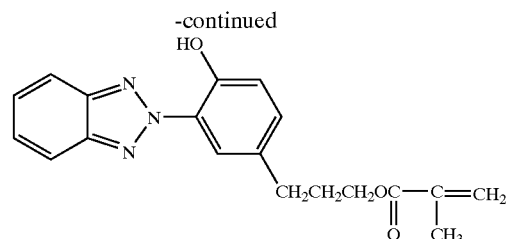

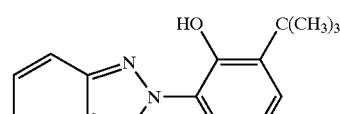

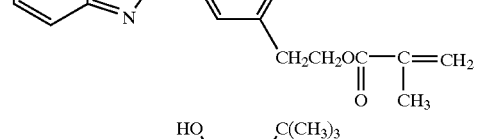

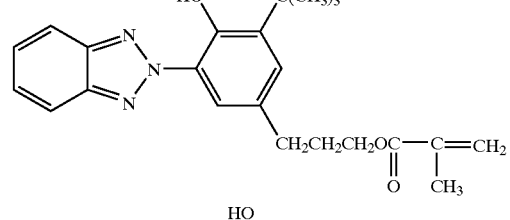

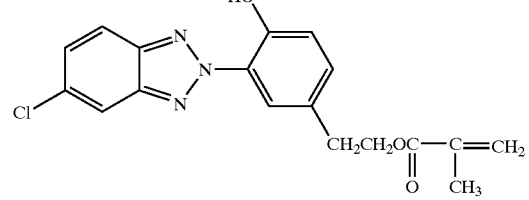

Of these, 2-(2'-hydroxy-5'-methacryloxyethylphenyl)-2H-benzotriazole of the following structure is especially preferred.

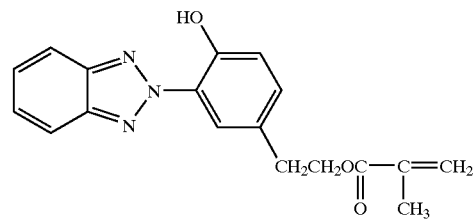

On the other hand, the amino group-containing organoxysilane is represented by of the general formula (B).

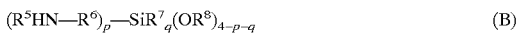

(B)

Herein R⁷ stands for alkyl groups or aryl groups of 1 to 10 carbon atoms, for example, methyl, ethyl, propyl, hexyl, decyl and phenyl. R⁸ stands for hydrogen or monovalent organic groups of 1 to 10 carbon atoms, examples of which include alkyl, alkenyl, alkoxyalkyl, and acyl groups, with the alkyl and acyl groups being preferred. Illustrative examples are methyl, ethyl, propyl, isopropyl, butyl, hexyl, phenyl, isopropenyl, methoxyethyl and acetyl groups. The letter p is equal to 1 or 2, q is equal to 0 or 1, and p+q is equal to 1 or 2.

Since the amino group-containing organoxysilane must have a function of securing to the substrate, it is undesirable to use those compounds in which the number of hydrolyzable groups (OR⁸) is 0 or 1, that is, (p+q) is equal to 3 or 4.

$R^5$ stands for hydrogen or alkyl groups of 1 to 15 carbon atoms, especially 1 to 4 carbon atoms. $R^6$ stands for organic groups, that is, divalent hydrocarbon groups of 1 to 15 carbon atoms, especially 1 to 6 carbon atoms, typically alkylene groups, or amino group-containing divalent hydrocarbon groups of 1 to 15 carbon atoms, especially 1 to 6 carbon atoms, typically alkylene groups which are separated by an imino or alkylimino group such as NH, $N(CH_3)$ or $N(C_2H_5)$. Examples of the alkyl and alkylene groups are as exemplified above. Examples of $R^5$—HN—$R^6$— are given below.

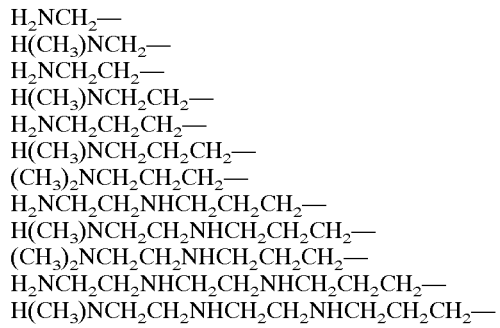

Of these, $H_2NCH_2CH_2CH_2$— and $H_2NCH_2CH_2NHCH_2CH_2CH_2$— are preferred.

Illustrative examples of the amino group-containing organoxysilane of formula (B) include 3-aminopropyltrimethoxysilane, 3-aminopropyltriethoxysilane, 3-aminopropylmethyldimethoxysilane, 3-aminopropylmethyl-diethoxysilane, N-(2-aminoethyl)-3-aminopropyltrimethoxy-silane, N-(2-aminoethyl)-3-aminopropyltriethoxysilane, N-(2-aminoethyl)-3-aminopropylmethyldimethoxysilane, N-(2aminoethyl)-3-aminopropylmethyldiethoxysilane, 3-(trimethoxysilylpropyl)aminopropyltrimethoxysilane, 3-(triethoxysilylpropyl)aminopropyltriethoxysilane, 2-(trimethoxysilylpropyl)aminoethyl-3-aminopropyltrimethoxy-silane, and 2-(triethoxysilylpropyl) aminoethyl-3-aminopropyltriethoxysilane. Preferred from the standpoints of solubility in the coating composition and reactivity with polymerizable vinyl groups are 3-aminopropyl-trimethoxysilane, 3-aminopropyltriethoxysilane, 3-aminopropylmethyldimethoxysilane, 3-aminopropylmethyl-diethoxysilane, N-(2-aminoethyl)-3-aminopropyltrimethoxy-silane, N-(2-aminoethyl)-3-aminopropyltriethoxysilane, N-(2-aminoethyl)-3-aminopropylmethyldimethoxysilane, and N-(2-aminoethyl)-3-aminopropylmethyldiethoxysilane.

In the practice of the invention, compounds (A) and compounds (B) each may be used singly or in admixture of two or more.

The amounts of compounds (A) and (B) are not critical although it is preferred to use 0.5 to 3 mol, and more preferably 1 to 2 mol of compound (A) per mol of compound (B). With less than 0.5 mol of compound (A) used, the absolute amount of component (A) participating in UV absorption becomes small. With more than 3 mol of compound (A) used, the reaction product may become less soluble in the coating composition and less effective for securing to the substrate, leading to poor weather resistance.

When compounds (A) and (B) are mixed and heated, addition reaction readily takes place between them as shown by the following scheme.

This reaction is preferably carried out by heating compounds (A) and (B) at a temperature of about 20 to 180° C. for about 1 to 20 hours. The reaction may be effected without a solvent or in a solvent in which both compounds (A) and (B) are soluble. For easy control of reaction and ease of handling, a polar solvent is preferably used. Exemplary solvents are tetrahydrofuran, dioxane, and dimethylformamide.

In the practice of the invention, a partial or complete hydrolyzate of the reaction product may be used as well. The hydrolyzate of the reaction product can be prepared by adding water to a lower alcohol solution of the silane compound in the presence of an acid catalyst, thereby effecting hydrolysis. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

To the first coating composition comprising the reaction product and/or (partial) hydrolyzate (1) as the essential component, component (2) may be added as an optional component.

Component (2) is a silane compound of the general formula (C) and/or a hydrolyzate thereof.

 (C)

Herein $R^9$ is an alkyl group, aryl group, halogenated alkyl group, halogenated aryl group or alkenyl group of 1 to 10 carbon atoms, or an organic group having an epoxy, (meth) acryloxy, mercapto, amino or cyano group. Examples include alkyl groups such as methyl, ethyl, propyl, isopropyl, butyl, hexyl, decyl and cyclohexyl; aryl groups such as phenyl and phenethyl; halogenated alkyl groups such as 3-chloropropyl, 3,3,3-trifluoropropyl, and 3,3,4,4,5,5,6,6,6-nonafluorohexyl; halogenated aryl groups such as p-chlorophenyl; alkenyl groups such as vinyl, allyl, 9-decenyl and p-vinylbenzyl; epoxy group-containing organic groups such as 3-glycidoxypropyl, β-(3,4-epoxycyclohexyl)ethyl and 9,10-epoxydecyl; (meth)acryloxy group-containing organic groups such as γ-methacryloxypropyl and γ-acryloxy; mercapto group-containing organic groups such as γ-mercaptopropyl and p-mercaptomethylphenylethyl; amino group-containing organic groups such as γ-aminopropyl and (β-aminoethyl)-γ-aminopropyl; and cyano group-containing organic groups such as β-cyanoethyl. $R^7$ and $R^8$ are as defined and exemplified in formula (B). The letters r and s each are equal to 0, 1 or 2, and r+s is equal to 0, 1 or 2. The silane compound used herein functions as a binder having a bonding ability.

Illustrative, non-limiting, examples of the silane compounds that satisfy the above conditions include trialkoxy or triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropylmethyldimethoxysilane, γ-glycidoxypropyl-triethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, β-(3,4-epoxycyclohexyl)-ethylmethyldiethoxysilane, γ-methacryloxypropyltrimethoxy-silane, γ-acryloxypropyltrimethoxysilane, γ-aminopropyltrimethoxysilane, γ-aminopropyltriethoxysilane, γ-mercapto-propyltrimethoxysilane, γ-mercaptopropyltriethoxysilane, N-(β-aminoethyl)-γ-aminopropyltrimethoxysilane, and β-cyanoethyltrimethoxysilane;

dialkoxysilanes or diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, 3,3,3-trifluoropropylmethyl-dimethoxysilane, γ-methacryloxypropylmethyldimethoxysilane, γ-acryloxypropylmethyldimethoxysilane, γ-aminopropylmethyl-dimethoxysilane, γ-aminopropylmethyldiethoxysilane, γ-mercaptopropylmethyldimethoxysilane, γ-mercaptopropylmethyl-diethoxysilane, N-(β-aminoethyl)-γ-aminopropylmethyl-dimethoxysilane, and β-cyanoethylmethyldimethoxysilane; and tetraalkoxysilanes such as methyl silicate, ethyl silicate, n-propyl silicate, n-butyl silicate, sec-butyl silicate, and t-butyl silicate.

Partial or complete hydrolyzates of these silane compounds are also useful. These silane compounds and/or hydrolyzates thereof may be used alone or in admixture of two or more.

The (partial) hydrolyzates of the above silane compounds are obtained, for example, by adding water to a lower alcohol solution of the silane compound in the presence of an acid catalyst and effecting hydrolysis. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

In the coating composition of the invention, preferably 0.1 to 100 parts, and more preferably 1 to 50 parts by weight of the reaction product and/or its hydrolyzate as component (1) is blended with 100 parts by weight as solids of the silane compound and/or its (partial) hydrolyzate as component (2). Blending of more than 100 parts of component (1) is uneconomical whereas less than 0.1 part of component (1) fails to provide desired weather resistance.

In one preferred embodiment of the invention, the coating composition contains a co-hydrolyzate resulting from co-hydrolysis of the reaction product and/or its (partial) hydrolyzate (1) and the silane compound and/or its (partial) hydrolyzate (2). This means that the reaction product and/or its (partial) hydrolyzate (1) is previously incorporated into the hydrolyzate of the silane compound (2). Also in this embodiment, co-hydrolysis is effected by adding water to a lower alcohol solution of the reaction product and/or its (partial) hydrolyzate (1) and the silane compound and/or its (partial) hydrolyzate (2) in the presence of an acid catalyst. Exemplary lower alcohols are methanol, ethanol, isopropanol and butanol.

In this embodiment, 0.1 to 100 parts, especially 1 to 50 parts by weight of the reaction product and/or its (partial) hydrolyzate as component (1) is preferably mixed with 100 parts by weight of the silane compound and/or its (partial) hydrolyzate as component (2). More than 100 parts of component (1) is uneconomical and causes gelation during reaction leading to non-uniformity whereas less than 0.1 part of component (1) fails to provide desired weather resistance.

In the first coating composition of the invention, a microparticulate inorganic oxide may be blended as an optional component (3). This component is also designated an inorganic UV absorber since it is a microparticulate inorganic oxide capable of absorbing detrimental light rays with a wavelength of up to 400 nm which can cause decomposition and degradation of organic compounds. Since oxides of titanium, cerium and zinc have an ability to absorb light rays of up to 400 nm in wavelength, the microparticulate inorganic oxide must contain at least one of titanium, cerium and zinc. If necessary, a metal oxide other than the above-described ones is added to the inorganic oxide particles in any desired manner for the purpose of stabilizing the particles or improving weather resistance, and as long as the light absorbing ability is not impaired. The manner of adding the other metal oxide includes simple addition, mechanical adsorption of the other metal oxide to the periphery of inorganic oxide particles, coating of inorganic oxide particles on their surface with a thin film of the other metal oxide, formation of mixed crystals by the sol-gel method, and doping of inorganic oxide particles with the other metal oxide in crystal form. Examples of the other metal include Si (silica), Al (alumina), Sn (tin oxide), Zr (zirconia), Sb (antimony oxide), Fe (iron oxide), and rare earth metals (rare earth metal oxides) though not limited thereto. Of these, oxides of Si, Al, Sn and Zr are preferred. The inorganic oxide particles should preferably have a particle size of 1 to 300 mμ, more preferably 1 to 200 mμ. Particles with a size of greater than 300 mμ may adversely affect light transmission. Particles with a size of less than 1 mμ are inadequate since they are unstable and difficult to prepare. The inorganic oxide particles may be used in the form of powder, water dispersion or organic solvent dispersion.

In the first coating composition, preferably 0.1 to 100 parts, more preferably 1 to 80 parts by weight of the inorganic oxide particles (3) is blended with 100 parts by weight as solids of the silane compound and/or its (partial) hydrolyzate (2). Less than 0.1 part of component (3) is ineffective for further improving weather resistance and achieving the combined effect with component (1). Blending of more than 100 parts of component (3) may adversely affect film strength and film transparency and is uneconomical.

Where the microparticulate inorganic oxide (3) is blended in the coating composition of the preferred embodiment, preferably 0.1 to 100 parts, more preferably 2 to 20 parts by weight of component (3) is blended per 100 parts by weight as solids of the co-hydrolyzate of the silane compound and/or its (partial) hydrolyzate (2) and the reaction product and/or its (partial) hydrolyzate (1). Less than 0.1 part of component (3) is ineffective for further improving weather resistance and achieving the combined effect with component (1). Blending of more than 100 parts of component (3) may adversely affect film strength and film transparency.

In the first coating composition, colloidal silica is preferably blended as an optional fourth component. Colloidal silica is blended in an amount of 1 to 200 parts, especially 10 to 150 parts by weight of per 100 parts by weight of component (2). One exemplary blending procedure is by mixing 20 to 90 parts by weight of the silane compound and/or its (partial) hydrolyzate (2) with 10 to 80 parts by weight as solids of a colloidal silica containing silica fines having a particle size of 1 to 100 nm to a total amount of 100 parts by weight. The mixture is diluted with alcohol, water or water-miscible solvent to a nonvolatile concentration of 15 to 20% by weight. The dilution is ripened at room temperature for about 3 to 5 days or at 40 to 60° C. for about 10 to 15 hours. The term "colloidal silica" is a dispersion of silica fines in water or an alcohol such as methanol, ethanol, isobutanol or diacetone alcohol.

Also, upon the above-described hydrolysis, the colloidal silica may be added along with the acid catalyst. To the colloidal silica-laden protective coating composition, a buffer solution and a curing catalyst are preferably added so as to provide adequate abrasion resistance. Examples of the curing catalyst include dimethylamine, acetic ethanol amine, formic dimethylaniline, benzoic acid, tetraethylammonium salts, sodium acetate, sodium propionate, sodium formate, and trimethylammonium benzoyl acetate. An appropriate amount of the curing catalyst added is 0.02 to 0.4 part by weight per 100 parts by weight as solids of the colloidal silica-laden protective coating composition.

From the standpoint of insuring stability, the coating composition is preferably adjusted to pH 2 to 7, at which silanol groups remain stable, and especially pH 3 to 6. The buffer used for pH adjustment may be a combination of acidic and basic compounds, for example, a combination of acetic acid and sodium acetate and a combination of disodium hydrogen phosphate and citric acid.

In the coating composition, well-known additives commonly used in conventional coating compositions, such as leveling agents, are blended if necessary.

The coating composition is useful in protecting surfaces of various articles, especially plastic articles. Specifically the coating composition is applied to an article substrate to form a protective coating thereon. The plastic article substrates to which the composition is applicable include those of polycarbonate, polystyrene, modified acrylic resins, urethane resins, thiourethane resins, polycondensates of halogenated bisphenol A and ethylene glycol, acrylic urethane resins, halogenated aryl group-containing acrylic resins, and sulfur-containing resins. The benefits become more outstanding when the coating composition is applied to transparent plastic substrates, and especially polycarbonate resins.

When the coating composition is applied to an article substrate to form a protective coating thereon, it is preferred that a primer layer intervenes between the substrate and the coating in order to enhance the adhesion to the substrate, especially plastic substrate.

The primer coating composition used herein is: in a first preferred embodiment, a primer coating composition comprising above component (1) as an essential component; or in a second preferred embodiment, a primer coating composition comprising an alkoxy group-containing organic copolymer comprising (A) a UV-absorbing benzotriazole based vinyl monomer, (B) an alkoxysilyl group-containing vinyl monomer, and (C) another copolymerizable monomer, the alkoxysilyl group-containing vinyl monomer accounting for 0.1 to 50% by weight of the copolymer.

Reference is now made to the primer coating composition of the first preferred embodiment. This composition contains the silyl-modified benzotriazole base compound (1) as an essential component and other constituents.

The constituents other than component (1) are described. An organic copolymer resin becoming a predominant component in the primer coating composition is preferably an organic copolymer of an alkoxysilyl group-containing acrylic and/or vinyl monomer with another monomer copolymerizable therewith.

Owing to the alkoxysilyl groups introduced, the primer coating composition is endowed with reactivity with the protective coating layer overlying the primer layer and improved in adhesion. Crosslinking of alkoxysilyl groups together improves heat resistance and imparts durability. Additionally, the copolymer is well compatible with the reaction product, i.e., silyl-modified benzotriazole compound.

If the content of the alkoxysilyl group-containing monomer is less than 0.1% by weight, heat resistance and durability are not improved, and compatibility with the reaction product or silyl-modified benzotriazole compound is aggravated. If the content of the alkoxysilyl group-containing monomer is more than 50% by weight, the copolymer would become too hard, losing adhesion. Therefore, the content of the alkoxysilyl group-containing acrylic and/or vinyl monomer is 0.1 to 50% by weight based on the total weight combined with the other monomer.

Examples of the alkoxysilyl group-containing acrylic monomer include 3-methacryloxypropyltrimethoxysilane, 3-methacryloxypropyltriethoxysilane, 3-methacryloxypropyl-methyldimethoxysilane, 3-methacryloxypropylmethyl-diethoxysilane, 3-acryloxypropyltrimethoxysilane, 3-acryloxypropyltriethoxysilane, 3-acryloxypropylmethyl-dimethoxysilane, 3-acryloxypropylmethyldiethoxysilane, 3-methacryloxymethyltrimethoxysilane, 3-methacryloxymethyl-triethoxysilane, 3-methacryloxymethylmethyldimethoxysilane, 3-methacryloxymethylmethyldiethoxysilane, 3-acryloxymethyl-trimethoxysilane, 3-acryloxymethyltriethoxysilane, 3-acryloxymethylmethyldimethoxysilane, and 3-acryloxymethyl-methyldiethoxysilane. Of these, 3-methacryloxypropyl-trimethoxysilane and 3-methacryloxy-propylmethyldimethoxysilane are preferred for ease of handling, crosslinked density and reactivity.

Examples of the alkoxysilyl group-containing vinyl monomer include vinyltrimethoxysilane, vinyltriethoxysilane, vinyltris(2-methoxyethoxy)silane, vinylmethyldimethoxy-silane, vinylmethyldiethoxysilane, vinylmethylbis(2-methoxyethoxy)silane, 3-vinyloxypropyltrimethoxysilane, 3-vinyloxypropyltriethoxysilane, 3-vinyloxypropyl-methyldimethoxysilane, 3-vinyloxypropylmethyldiethoxysilane, styryltrimethoxysilane, styryltriethoxysilane, styrylmethyl-dimethoxysilane, and styrylmethyldiethoxysilane. Of these, vinyltrimethoxysilane, vinyltriethoxysilane, and 3-vinyloxypropyltrimethoxysilane are preferred for ease of handling and reactivity.

Examples of the other monomer copolymerizable with the alkoxysilane monomer include alkyl methacrylates such as methyl methacrylate, butyl methacrylate, and 2-ethylhexyl methacrylate; alkyl acrylates such as methyl acrylate, ethyl acrylate, and butyl acrylate; vinyl ethers such as glycidyl methacrylate, acrylamide, acrylonitrile, vinyl acetate, ethyl vinyl ether, butyl vinyl ether, and hexyl vinyl ether; styrene and ethylene glycol dimethacrylate; and methacrylic group-containing benzotriazoles represented by above formula (A) serving as a UV absorber such as 2-(2'-hydroxy-5'-methacryloxyethylphenyl)-2H-benzotriazole. It is noted that compounds having a group capable of reacting with the alkoxysilyl group, for example, 2-hydroxyethyl methacrylate are undesirable since they can cause the primer coating composition to change with time, typically thickening or gelling.

The organic copolymer constituting the main component of the first primer coating composition according to the invention is a copolymer of the alkoxysilyl group-containing monomer with the other monomer copolymerizable therewith. The copolymer is readily obtained by adding a radical polymerization initiator to a solution of the monomers, followed by heating to effect reaction. The initiator is selected from peroxides such as dicumyl peroxide and benzoyl peroxide and azo compounds such as azobisisobutyronitrile.

Preferably the organic copolymer have a weight average molecular weight of about 1,000 to about 200,000.

If the organic copolymer is less than 10% by weight of the primer coating composition, the composition may become thermoplastic and less resistant to heat. If the organic copolymer exceeds 80% by weight of the primer coating composition, adhesion may become poor. Therefore, an appropriate amount of the organic copolymer is 10 to 80% by weight of the primer coating composition.

The organic copolymer and the reaction product or silyl-modified benzotriazole compound (1) are blended such that 0.1 to 50 parts, especially 2 to 50 parts by weight of the reaction product (1) is available per 100 parts by weight of the organic copolymer. More than 50 parts of the reaction product (1) is uneconomical whereas less than 0.1 part of the reaction product (1) fails to provide the desired weather resistance.

If the first primer coating composition has a too low viscosity to apply and thus forms only a thin coating, an acrylic polymer may be added as a component capable of imparting flexibility without detracting from adhesion. Such useful acrylic polymers include poly(alkyl methacrylates) and poly(alkyl acrylates) such as poly(methyl methacrylate), poly(butyl methacrylate), and poly(butyl acrylate), and copolymers thereof. These acrylic polymers are effective for imparting flexibility to the primer coating composition without detracting from adhesion. The amount of the acrylic polymer added is desirably limited to 30% by weight or less based on the entire primer coating composition since more than 30% by weight of the acrylic polymer can preclude the composition from heat curing.

In the first primer coating composition, a compound containing a nitrogen atom and an alkoxysilyl group in a molecule may be added for the purposes of assisting the composition in forming a satisfactory bond having water resistance, and fixing within the coating the silyl-modified benzotriazole compound in component (1), the organic copolymer and optional photo-stabilizer by crosslinking with alkoxysilyl groups therein. Preferably the compound contains at least one nitrogen atom and at least two alkoxysilyl groups in a molecule.

Preferred examples of the compound used herein include an amino group-containing alkoxysilane, amino group-containing di(alkoxysilane), amide group-containing alkoxysilane, one obtained by reacting an amino group-containing alkoxysilane with an epoxy group-containing alkoxysilane and a silylating agent and amidating the reaction product, the reaction product of an amino group-containing alkoxysilane with a polyfunctional (meth)acrylic compound, the reaction product of an amino group-containing alkoxysilane with a (meth)acrylic compound, the reaction product of an amino group-containing alkoxysilane with a (meth)acrylic group-containing alkoxysilane, the reaction product of a polyamine compound with a (meth) acrylic group-containing alkoxysilane, one obtained by reacting an amino group-containing alkoxysilane with a polyfunctional isocyanate compound and amidating the reaction product, one obtained by reacting an amino group-containing alkoxysilane with an isocyanate group-containing alkoxysilane and amidating the reaction product, and the reaction product of a thiol group-containing alkoxysilane with an isocyanate group-containing alkoxysilane. Of these, preferred is the one obtained by reacting an amino group-containing alkoxysilane with an epoxy group-containing alkoxysilane and a silylating agent and amidating the reaction product.

Illustrative examples of the components used herein are described. Examples of the amino group-containing alkoxysilane include 3-aminopropyltrimethoxysilane, 3-aminopropyltriethoxysilane, 3-aminopropylmethyldimethoxy-silane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropyl-methyldiethoxysilane, 3-(trimethoxysilylpropyl)-aminopropyltrimethoxysilane, 3-(triethoxysilylpropyl)-aminopropyltriethoxysilane, 2-(trimethoxysilylpropyl)-aminoethyl-3-aminopropyltrimethoxysilane, and 2-(triethoxy-silylpropyl) aminoethyl-3-aminopropyltriethoxysilane.

Examples of the amide group-containing alkoxysilane include ureidopropyltrimethoxysilane, ureidopropyltriethoxy-silane, ureidopropylmethyldimethoxysilane, and ureidopropyl-methyldiethoxysilane.

The process of obtaining the amide compound by reacting an amino group-containing alkoxysilane with an epoxy group-containing alkoxysilane and a silylating agent and amidating the reaction product is described below. The amino group-containing alkoxysilane is as exemplified above although N-(2-aminoethyl)-3-aminopropyltrimethoxysilane and N-(2-aminoethyl)-3-aminopropylmethyldimethoxysilane are preferred for adhesion and operation. Illustrative examples of the epoxy group-containing alkoxysilane include γ-glycidoxypropyltrimethoxysilane, γ-glycidoxypropylmethyldimethoxysilane, γ-glycidoxypropyl-triethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, and β-(3,4-epoxycyclohexyl)ethylmethyldiethoxysilane. From the standpoints of reactivity and ease of operation, the preferred silane compounds are γ-glycidoxypropyl-trimethoxysilane, γ-glycidoxypropylmethyldimethoxysilane, and β-(3,4-epoxycyclohexyl)ethylmethyldimethoxysilane.

Examples of the silylating agent include hexamethyldisilazane, N,N'-bis(trimethylsilyl)formamide and N,N'-bis(trimethylsilyl)urea. When the amino group-containing alkoxysilane reacts with an epoxy group-containing alkoxysilane, the silylating agent serves to protect the OH groups generated by the reaction for preventing reaction between OH groups and alkoxysilyl groups, thereby precluding a change with time of the reaction product.

Reaction of the amino group-containing alkoxysilane with the epoxy group-containing alkoxysilane and the silylating agent may be effected by adding dropwise the epoxy group-containing alkoxysilane to a mixture of the amino group-containing alkoxysilane and the silylating agent and heating the mixture for reaction. Alternatively, the amino group-containing alkoxysilane is reacted with the epoxy group-containing alkoxysilane, and the silylating agent is added to the reaction product for further reaction.

In this reaction, the amino group-containing alkoxysilane and the epoxy group-containing alkoxysilane are preferably used in such amounts that the molar ratio of epoxy groups to amino (=N—H) groups may range from 0.3/1 to 1.2/1. If the molar ratio of epoxy/amino is less than 0.3, only a less number of alkoxy groups per molecule participate in crosslinking, leading to short cure, and the entire molecule is not spread, leading to a weak surface bond. If the molar ratio of epoxy/amino is more than 1.2, amino (=N—H) groups which can be amidated during subsequent amidation step become few, exacerbating water-resistant bond.

The reaction product is then amidated. For amidation, the reaction product may be reacted with a carboxylic acid halide, acid anhydride or acid isopropenyl ester such as acetic chloride, acetic bromide, propionic chloride, acetic anhydride, isopropenyl acetate or benzoyl chloride.

In the first primer coating composition, 0.5 to 20 parts by weight of the compound is preferably blended per 100 parts by weight of the organic copolymer. An excessive amount of the compound may result in a primer layer having a too high crosslinked density, a high hardness, and rather poor adhesion.

In the first primer coating composition, a photo-stabilizer having at least one cyclic hindered amine structure in a molecule may be added for improving weather resistance. The photo-stabilizer used herein should preferably be fully soluble in the solvent of the primer coating composition, compatible with the organic copolymer, and low volatile. In the primer coating composition, 2.6 to 10 parts by weight of the photo-stabilizer is preferably blended per 100 parts by weight of the organic copolymer. More than 10 parts of the photo-stabilizer detracts from adhesion of a coating.

Illustrative examples of the photo-stabilizer include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, a condensate of 1,2,3,4-butanetetracarboxylic acid with 2,2,6,6-tetramethylpiperidinol and tridecanol, 8-acetyl-3-dodecyl-7,7,9,9-tetramethyl-1,3,8-triazaspiro[4,5]decane-2,4-dione, a condensate of 1,2,3,4-butanetetracarboxylic acid with 1,2,6,6-tetramethyl-4-piperidinol and β,β,β,β'-tetramethyl-3,9-(2,4,8,10-tetraoxaspiro[5,5]undecane)diethanol, and a condensate of 1,2,3,4-butanetetracarboxylic acid with 2,2,6,6-tetramethyl-4-piperidinol and β,β,β,β'-tetramethyl-3,9-(2,4,8,10-tetraoxaspiro[5,5]undecane)diethanol. For the purpose of fixing the photo-stabilizer, there may be also used silyl-modified photo-stabilizers as disclosed in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, and 2,2,6,6-tetramethylpiperidino-4-propylmethyldiethoxysilane as well as (partial) hydrolyzates thereof. These photo-stabilizers may be used in admixture of two or more.

In the first primer coating composition, a conventional ultraviolet absorber which has not been silyl modified may be added insofar as no detrimental effect is exerted. Such UV absorbers are organic UV absorbers compatible with the organic copolymer. Derivatives of compounds having a hydroxybenzophenone, benzotriazole, cyanoacrylate or triazine main skeleton are especially preferred. Also acceptable are polymers such as vinyl polymers having such a UV absorber incorporated on a side chain. Exemplary UV absorbers are 2,4'-dihydroxy-benzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, 4-(2-acryloxyethyl)-2-hydroxybenzophenone polymer, and 2-(2'-hydroxy-5'-methacryloxyethylphenyl)-2H-benzotriazole polymer. Of these, 2,2',4,4'-tetrahydroxybenzophenone is most preferred from the standpoints of compatibility with the primer coating composition and volatility. These organic UV absorbers may be used in admixture of two or more.

On use, the primer coating composition is diluted with a solvent. Useful solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene, and toluene. The primer coating composition is generally diluted with the solvent into a solution containing 5 to 10% by weight of the organic copolymer prior to use.

In the second preferred embodiment, the primer coating composition contains an organic copolymer comprising
(A) a benzotriazole based UV-absorbing vinyl monomer,
(B) an alkoxysilyl group-containing vinyl monomer, and
(C) another copolymerizable monomer.

The benzotriazole based UV-absorbing vinyl monomer (A) used herein is not critical as long as it has at least one benzotriazole based UV-absorbing group and at least one vinyl group in a molecule. Typical are compounds of the general formula (2).

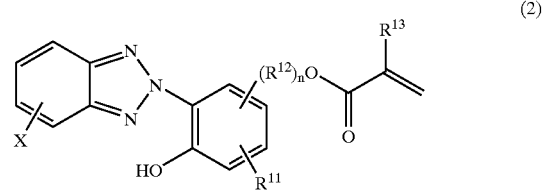

(2)

Herein, X is hydrogen or chlorine. $R^{11}$ is hydrogen, methyl or a tertiary alkyl group of 4 to 8 carbon atoms. $R^{12}$ is a straight or branched alkylene group of 2 to 10 carbon atoms. $R^{13}$ is hydrogen or methyl. The letter n is equal to 0 or 1.

In formula (2), examples of the tertiary $C_{4-8}$ alkyl group represented by $R^{11}$ include tert-butyl, tert-pentyl, tert-hexyl, tert-heptyl, tert-octyl and di-tert-octyl. Examples of the straight or branched $C_{2-10}$ alkylene group represented by $R^{12}$ include ethylene, trimethylene, propylene, tetramethylene, 1,1-dimethyltetramethylene, butylene, octylene, and decylene, with ethylene and propylene being preferred.

Illustrative, non-limiting, examples of the compound of formula (2) include 2-(2'-hydroxy-5'-methacryloxyphenyl)-2H-benzotriazole, 2-(2'-hydroxy-3'-tert-butyl-5'-methacryloxymethylphenyl)-2H-benzotriazole, 2-[2'-hydroxy-5'-(2-methacryloxyethyl)phenyl]-2H-benzotriazole, 2-[2'-hydroxy-5'-(2-acryloxyethyl)phenyl]-2H-benzotriazole, 2-[2'-hydroxy-3'-tert-butyl-5'-(2-methacryloxyethyl)phenyl]-5-chloro-2H-benzotriazole, and 2-[2'-hydroxy-3'-methyl-5'-(8-acryloxyoctyl)phenyl]-2H-benzotriazole.

The benzotriazole based UV-absorbing vinyl monomer (A) may be used alone or in admixture of two or more.

The content of the benzotriazole based UV-absorbing vinyl monomer (A) in the organic copolymer is preferably 0.1 to 50%, and more preferably 3 to 40% by weight based on the copolymer composition when the compatibility of the resulting organic polymer with other primer constituents and the weather resistance of the resulting primer coating composition are taken into account. Copolymers with more than 50 wt % of the vinyl monomer (A) may become less compatible with other constituents of the primer coating composition and is uneconomical. Less than 0.1 wt % may fail to provide the desired weather resistance.

In the organic copolymer, the alkoxysilyl group-containing vinyl monomer (B) accounts for 0.1 to 50% by weight based on the copolymer composition. Less than 0.1 wt % of the vinyl monomer (B) fails to improve heat resistance and durability. Copolymers with more than 50 wt % of the vinyl monomer (B) becomes too hard to provide adhesion.

The alkoxysilyl group-containing vinyl monomer (B) used herein is not critical as long as it has at least one alkoxysilyl group and at least one vinyl group in a molecule. Typical are compounds of the general formula (3).

$$R^{16}\text{—}R^{17}\text{—}SiR^{18}_{3-L}(OR^{19})_L \quad (3)$$

Herein, $R^{16}$ is a polymerizable unsaturated group, $R^{17}$ is a straight or branched alkylene group of 1 to 10 carbon atoms, $R^{18}$ and $R^{19}$, which may be the same or different, are alkyl groups of 1 to 6 carbon atoms, and L is an integer of 1 to 3.

In formula (3), exemplary polymerizable unsaturated groups represented by $R^{16}$ are vinyl, vinyloxy, (meth)acrylic, (meth)acryloyloxy, and styryl. Examples of straight or branched $C_{1-10}$ alkylene group represented by $R^{17}$ include methylene, ethylene, trimethylene, propylene, tetramethylene, 1,1-dimethyltetramethylene, butylene, octylene, and decylene. Examples of the $C_{1-6}$ alkyl group represented by $R^{18}$ and $R^{19}$ are methyl, ethyl, propyl, butyl, pentyl and hexyl.

As the alkoxysilyl group-containing vinyl monomer (B), exemplary (meth)acrylic functional monomers include 3-methacryloxypropyltrimethoxysilane, 3-methacryloxypropyl-triethoxysilane, 3-methacryloxypropylmethyldimethoxysilane, 3-methacryloxypropylmethyldiethoxysilane, 3-acryloxypropyltrimethoxysilane, 3-acryloxypropyl-triethoxysilane, 3-acryloxypropylmethyldimethoxysilane, 3-acryloxypropylmethyldiethoxysilane, 3-methacryloxymethyltrimethoxysilane, 3-methacryloxymethyltriethoxysilane, 3-methacryloxymethylmethyldimethoxysilane, 3-methacryloxymethylmethyldiethoxysilane, 3-acryloxymethyltrimethoxysilane, 3-acryloxymethyltriethoxysilane, 3-acryloxymethylmethyldimethoxysilane, and 3-acryloxymethylmethyldiethoxysilane. Of these, 3-methacryloxypropyltrimethoxysilane and 3-methacryloxypropylmethyldimethoxysilane are preferred for ease of handling, crosslinked density and reactivity.

Other examples of the alkoxysilyl group-containing vinyl monomer (B) are vinyltrimethoxysilane, vinyltriethoxysilane, vinyltris(2-methoxyethoxy)silane, vinylmethyldimethoxysilane, vinylmethyldiethoxysilane, vinylmethylbis(2-methoxyethoxy)silane, 3-vinyloxypropyltrimethoxysilane, 3-vinyloxypropyltriethoxysilane, 3-vinyloxypropylmethyldimethoxysilane, 3-vinyloxypropyl-methyldiethoxysilane, styrylethyltrimethoxysilane, and styryltrimethoxysilane. Of these, vinyltrimethoxysilane, vinyltriethoxysilane, and 3-vinyloxypropyltrimethoxysilane are preferred for ease of handling and reactivity.

The other monomers (C) copolymerizable with the foregoing monomers include acrylic monomers having a cyclic hindered amine structure, (meth)acrylates, (meth)acrylonitrile, (meth)acrylamides, alkyl vinyl ethers, alkyl vinyl esters, styrene and derivatives thereof.

Examples of suitable acrylic monomers having a cyclic hindered amine structure are 2,2,6,6-tetramethyl-4-piperidinyl methacrylate and 1,2,2,6,6-pentamethyl-4-piperidinyl methacrylate. These photo-stabilizers may be used in admixture of two or more.

Examples of suitable (meth)acrylates and derivatives thereof include (meth)acrylates of monohydric alcohols such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, n-pentyl (meth)acrylate, isopentyl (meth)acrylate, n-hexyl (meth)acrylate, isohexyl (meth)acrylate, n-heptyl (meth)acrylate, isoheptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, palmityl (meth)acrylate, stearyl (meth)acrylate, cyclohexyl (meth)acrylate, 4-methyl-cyclohexyl (meth)acrylate, 4-t-butylcyclohexyl (meth)acrylate, and benzyl (meth)acrylate;

(meth)acrylates of alkoxy(poly)alkylene glycols such as 2-methoxyethyl (meth)acrylate, 2-methoxybutyl (meth)acrylate, 3-methoxypropyl (meth)acrylate, 2-methoxybutyl (meth)acrylate, 3-methoxybutyl (meth)acrylate, 4-methoxybutyl (meth)acrylate, methoxypolyethylene glycol (meth)acrylate (e.g., the number of ethylene glycol units is 2 to 20), and methoxypolypropylene glycol (meth)acrylate (e.g., the number of propylene glycol units is 2 to 20);

mono(meth)acrylates of polyhydric alcohols such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, glycerin mono(meth)acrylate, pentaerythritol mono(meth)acrylate, polyethylene glycol mono(meth)acrylate (e.g., the number of ethylene glycol units is 2 to 20), and polypropylene glycol mono (meth)-acrylate (e.g., the number of propylene glycol units is 2 to 20);

poly(meth)acrylates of polyhydric alcohols such as ethylene glycol di(meth)acrylate, propylene glycol di(meth)

acrylate, butylene glycol di(meth)acrylate, glycerin di(meth) acrylate, glycerin tri(meth)acrylate, pentaerythritol di(meth) acrylate, pentaerythritol tetra(meth)acrylate, 1,4-cyclohexane diol di(meth)acrylate, polyethylene glycol di(meth)acrylate (e.g., the number of ethylene glycol units is 2 to 20), and polypropylene glycol di(meth)acrylate (e.g., the number of propylene glycol units is 2 to 20);

(poly)esters of non-polymerizable polybasic acids with hydroxylalkyl (meth)acrylates, such as mono[2-(meth) acryloyloxyethyl] succinate, di[2-(meth)acryloyloxy-ethyl] succinate, mono[2-(meth)acryloyloxyethyl] adipate, di[2-(meth)acryloyloxyethyl] adipate, mono[2-(meth)acryloyloxyethyl] phthalate, and di[2-(meth)acryloyloxyethyl] phthalate;

amino group-containing (meth)acrylates such as 2-aminoethyl (meth)acrylate, 2-(N-methylamino)ethyl (meth)acrylate, 2-(N,N-dimethylamino)ethyl (meth) acrylate, 2-(N-ethylamino)ethyl (meth)acrylate, 2-(N,N-diethylamino)-ethyl (meth)acrylate, 3-(N,N-dimethylamino) propyl (meth)acrylate, and 4-(N,N-dimethylamino)butyl (meth)-acrylate; and epoxy group-containing (meth)acrylates such as glycidyl (meth)acrylate.

Examples of suitable (meth)acrylonitrile derivatives include α-chloroacrylonitrile, α-chloromethylacrylonitrile, α-trifluoromethylacrylonitrile, α-methoxyacrylonitrile, α-ethoxyacrylonitrile, and vinylidene cyanide. Examples of suitable (meth)acrylamide derivatives include N-methyl (meth)acrylamide, N,N-dimethyl(meth)acrylamide, N-ethyl (meth)acrylamide, N,N-diethyl(meth)acrylamide, N-methoxy(meth)acrylamide, N,N-dimethoxy(meth) acrylamide, N-ethoxy(meth)acrylamide, N,N-diethoxy (meth)acrylamide, diacetone (meth)acrylamide, N-methylol (meth)acrylamide, N-(2-hydroxyethyl)(meth)acrylamide, N,N-dimethylaminomethyl(meth)acrylamide, N-(2-dimethylamino)ethyl(meth)acrylamide, N,N'-methylene-bis (meth)acrylamide, and N,N'-ethylenebis(meth)acrylamide. Examples of suitable alkyl vinyl ethers include methyl vinyl ether, ethyl vinyl ether, butyl vinyl ether, and hexyl vinyl ether. Examples of suitable alkyl vinyl esters include vinyl formate, vinyl acetate, vinyl acrylate, vinyl lactate, vinyl caproate, and vinyl stearate. Examples of styrene and derivatives thereof include styrene, α-methylstyrene, and vinyl toluene. Of these monomers, (meth)acrylates are preferred. Especially preferred are methyl (meth)acrylate, ethyl (meth) acrylate, isopropyl (meth)acrylate, n-butyl (meth)acrylate, n-hexyl (meth)acrylate, 2-ethylhexyl (meth)acrylate, isononyl (meth)acrylate, cyclohexyl (meth)acrylate, 4-methylcyclohexyl (meth)acrylate, and 4-t-butylcyclohexyl (meth)acrylate.

The above monomers may be used alone or in admixture of two or more. Of these monomer, copolymerizing an acrylic monomer having a cyclic hindered amine structure is preferred for improving photo-stability and weather resistance. The preferred content of the acrylic monomer is 0.1 to 10% by weight based on the copolymer composition because more than 10 wt % of the acrylic monomer can detract from adhesion of the coating.

In the second primer coating composition of the invention, the organic copolymer as the main component is comprised of (A) the benzotriazole based UV-absorbing vinyl monomer, (B) the alkoxysilyl group-containing vinyl monomer, and (C) the other copolymerizable monomer, described above. The copolymer can be readily prepared by adding a radical polymerization initiator to a solution of the monomers, followed by heating to effect reaction. The initiator is selected from peroxides such as dicumyl peroxide and benzoyl peroxide and azo compounds such as azobisisobutyronitrile.

Preferably the organic copolymer have a weight average molecular weight of about 1,000 to about 200,000.

In the second primer coating composition, an appropriate amount of the organic copolymer is 10 to 80% by weight. If the organic copolymer is less than 10% by weight, the primer coating composition may become thermoplastic and less resistant to heat. If the organic copolymer exceeds 80% by weight of the primer coating composition, adhesion may become poor.

In the second primer coating composition, a compound containing a nitrogen atom and an alkoxysilyl group in a molecule may be added to the above organic copolymer. Preferably the compound contains at least one nitrogen atom and at least two alkoxysilyl groups in a molecule.

Preferred examples of the compound used herein include an amino group-containing alkoxysilane, amino group-containing di(alkoxysilane), amide group-containing alkoxysilane, one obtained by reacting an amino group-containing alkoxysilane with an epoxy group-containing alkoxysilane and a silylating agent and amidating the reaction product, the reaction product of an amino group-containing alkoxysilane with a (poly)(meth)acrylic compound, the reaction product of an amino group-containing alkoxysilane with a (meth)acrylic group-containing alkoxysilane, the reaction product of a polyamine compound with a (meth)acrylic group-containing alkoxysilane, and one obtained by reacting an amino group-containing alkoxysilane with a polyfunctional isocyanate compound and amidating the reaction product. Of these, preferred is the one obtained by reacting an amino group-containing alkoxysilane with an epoxy group-containing alkoxysilane and a silylating agent and amidating the reaction product.

Illustrative examples of the components used herein are described. Examples of the amino group-containing alkoxysilane include 3-aminopropyltrimethoxysilane, 3-aminopropyltriethoxysilane, 3-aminopropylmethyldimethoxy-silane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-(trimethoxysilylpropyl)-aminopropyltrimethoxysilane, 3-(triethoxysilylpropyl)-aminopropyltriethoxysilane, 2-(trimethoxysilylpropyl)-aminoethyl-3-aminopropyltrimethoxysilane, and 2-(triethoxy-silylpropyl) aminoethyl-3-aminopropyltriethoxysilane.

A typical amino group-containing di(alkoxysilane) is bis (trimethoxysilylpropyl)amine.

Examples of the amide group-containing alkoxysilane include ureidopropyltrimethoxysilane, ureidopropyltriethoxysilane, ureidopropylmethyldimethoxysilane, and ureidopropylmethyldiethoxysilane.

Examples of the (poly)(meth)acrylic compound include alkyl methacrylates such as methyl methacrylate, butyl methacrylate and 2-ethylhexyl methacrylate, alkyl acrylates such as methyl acrylate, ethyl acrylate and butyl acrylate, as well as acrylamide, acrylonitrile, and ethylene glycol dimethacrylate.

Examples of the polyamine compound include ethylene diamine, diethylene triamine, triethylene triamine, tetraethylene pentamine, and piperazine.

Examples of the polyisocyanate compound include toluene diisocyanate, diphenylmethane diisocyanate, hexamethylene diisocyanate, 2,2,4-trimethylhexamethylene diisocyanate, 2,4,4-trimethylhexamethylene diisocyanate, p-phenylene diisocyanate, 4,4'-dicyclohexylmethane diisocyanate, 3,3'-dimethyldiphenyl-4,4'-diisocyanate, dianisidine diisocyanate, m-xylene diisocyanate, isophorone diisocyanate, 1,5-naphthalene diisocyanate, trans-1,4-cyclohexyl diisocyanate, lysine diisocyanate, dimethyltriphenylmethane tetraisocyanate, triphenylmethane triisocyanate, and tris(phenyl isocyanate)thiophosphate.

Examples of the (meth)acrylic group-containing alkoxysilane are as exemplified above for the alkoxysilyl group-containing acrylic monomer.

The process of obtaining the amide compound by reacting an amino group-containing alkoxysilane with an epoxy group-containing alkoxysilane and a silylating agent and amidating the reaction product is described below. The amino group-containing alkoxysilane is as exemplified above although N-(2-aminoethyl)-3-aminopropyltrimethoxysilane and N-(2-aminoethyl)-3-aminopropylmethyldimethoxysilane are preferred for adhesion and operation. The epoxy group-containing alkoxysilane used herein is not critical although γ-glycidoxypropyltrimethoxysilane, γ-glycidoxypropylmethyldimethoxysilane, and β-(3,4-epoxycyclohexyl)-ethylmethyldimethoxysilane are preferred for reactivity and operation. Examples of the silylating agent include hexamethyldisilazane, N,N'-bis(trimethylsilyl)formamide and N,N'-bis(trimethylsilyl)urea. When the amino group-containing alkoxysilane reacts with the epoxy group-containing alkoxysilane, the silylating agent serves to protect the OH groups generated by the reaction for preventing reaction between OH groups and alkoxysilyl groups, thereby precluding a change with time of the reaction product.

Reaction of the amino group-containing alkoxysilane with the epoxy group-containing alkoxysilane and the silylating agent may be effected by adding dropwise the epoxy group-containing alkoxysilane to a mixture of the amino group-containing alkoxysilane and the silylating agent and heating the mixture for reaction. Alternatively, the amino group-containing alkoxysilane is reacted with the epoxy group-containing alkoxysilane, and the silylating agent is added to the reaction product for further reaction.

In this reaction, the amino group-containing alkoxysilane and the epoxy group-containing alkoxysilane are preferably used in such amounts that the molar ratio of epoxy groups to amino (=N—H) groups may range from 0.3/1 to 1.2/1. If the molar ratio of epoxy/amino is less than 0.3, only a less number of alkoxy groups per molecule participate in crosslinking, leading to short cure, and the entire molecule is not spread, leading to a weak surface bond. If the molar ratio of epoxy/amino is more than 1.2, amino (=N—H) groups which can be amidated during subsequent amidation step become few, exacerbating water-resistant bond.

The reaction product is then amidated. For amidation, the reaction product may be reacted with a carboxylic acid halide, acid anhydride or acid isopropenyl ester such as acetic chloride, acetic bromide, propionic chloride, acetic anhydride, isopropenyl acetate or benzoyl chloride.

In the second primer coating composition, 0.1 to 50 parts, especially 0.5 to 20 parts by weight of the above compound is preferably blended per 100 parts by weight of the organic copolymer. An excessive amount of the compound sometimes results in a primer layer having a too high crosslinked density, a high hardness, and rather poor adhesion.

Constituent components other than the reaction product in the second primer coating composition are described.

In the second primer coating composition, a photo-stabilizer having at least one cyclic hindered amine structure in a molecule may be added for improving weather resistance. The photo-stabilizer used herein should preferably be fully soluble in the solvent of the primer coating composition, compatible with the organic copolymer, and low volatile. In the primer coating composition, 0.1 to 10 parts by weight of the photo-stabilizer is preferably blended per 100 parts by weight of the organic copolymer. More than 10 parts of the photo-stabilizer detracts from adhesion of a coating. Examples of the photo-stabilizer are as exemplified above in connection with the first primer coating composition.

In the second primer coating composition, a conventional ultraviolet absorber which does not have a polymerizable group may be added insofar as no detrimental effect is exerted. Such UV absorbers are organic UV absorbers compatible with the organic copolymer. Derivatives of compounds having a hydroxybenzophenone, benzotriazole, cyanoacrylate or triazine main skeleton are especially preferred. Also acceptable are polymers such as vinyl polymers having such a UV absorber incorporated on a side chain. Exemplary UV absorbers are as exemplified above in connection with the first primer coating composition.

If the second primer coating composition has a too low viscosity to apply and thus forms only a thin coating, an acrylic polymer may be added as a component capable of imparting flexibility without detracting from adhesion. Such useful acrylic polymers include poly(alkyl methacrylates) and poly(alkyl acrylates) such as poly(methyl methacrylate), poly(butyl methacrylate), and poly(butyl acrylate), and copolymers thereof. These acrylic polymers are effective for imparting flexibility to the primer coating composition without detracting from adhesion. The amount of the acrylic polymer added is desirably limited to 30% by weight or less based on the entire primer coating composition since more than 30% by weight of the acrylic polymer can preclude the composition from heat curing.

On use, the primer coating composition is diluted with a solvent. Useful solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene, and toluene. The primer coating composition is generally diluted with the solvent into a solution containing 5 to 10% by weight of the organic copolymer prior to use.

The primer coating composition is applied to a surface of a plastic substrate, typically a plastic film, which has been cleaned, whereupon the diluting solvent is evaporated off at room temperature or elevated temperature, leaving a dry undercoat of about 1 to 10 μm, preferably about 2 to 5 μm thick. The organic solvent dilution should preferably have a viscosity of about 5 to 30 centistokes. A dilution with a viscosity of less than 5 centistokes would be difficult to form a thick coat whereas a dilution with a viscosity of more than 30 centistokes would be difficult to handle and apply. To the composition, a fluorine or silicone surfactant may be added for leveling of the coating, and a catalytic amount of a crosslinking/curing catalyst may also be added for accelerating cure.

By covering plastic substrates such as plastic films and sheets with the cured coat or primer layer of the primer coating composition, the substrates are improved in initial adhesion, heat resistance, hot-water resistance, and weather resistance. Advantageously, a topcoat is formed on the primer coat, using a coating composition.

The coating composition for the topcoat is in the first place, the coating composition of the first aspect mentioned above and in the second place, a conventional organopolysiloxane composition, especially a second coating composition comprising a hydrolyzate or co-hydrolyzate of an organoxysilane having the general formula (D):

$$R^{14}_x Si(OR^{15})_{4-x} \quad (D)$$

wherein $R^{14}$ is an alkyl group, aryl group, halogenated alkyl group, halogenated aryl group or alkenyl group of 1 to 10 carbon atoms, or an organic group having an epoxy, (meth)acryloxy, mercapto, amino or cyano group, $R^{15}$ is hydrogen or a monovalent organic group of 1 to 10 carbon atoms, and x is equal to 0, 1 or 2.

Reference is now made to the second coating composition. This composition is applied onto the primer coat of the primer coating composition on a plastic substrate and cured by heating, typically at a temperature of 50 to 140° C. In this way, a top coat is formed on the plastic substrate to a high bond strength. The top coat of organopolysiloxane synergistically cooperates with the primer coat of the primer coating composition to accomplish high adhesion and abrasion resistance as well as excellent weather resistance and its stability due to tight fixation of the UV absorber in the primer coat.

In formula (D), $R^{14}$ is an alkyl group, aryl group, halogenated alkyl group, halogenated aryl group or alkenyl group of 1 to 10 carbon atoms, or an organic group having an epoxy, (meth)acryloxy, mercapto, amino or cyano group, which are as exemplified for $R^9$ in above formula (C). The organic groups represented by $R^{15}$ are as exemplified for $R^8$ in above formula (B).

Illustrative, non-limiting, examples of the silane compounds that satisfy the above conditions include trialkoxy or triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, vinyltrimethoxysilane, vinyltriethoxysilane, vinyltriacetoxysilane, vinyltris(2-methoxyethoxy)-silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropylmethyldimethoxysilane, γ-glycidoxypropyl-triethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, β-(3,4-epoxycyclohexyl)-ethylmethyldiethoxysilane, γ-methacryloxypropyltrimethoxy-silane, γ-acryloxypropyltrimethoxysilane, γ-aminopropyltrimethoxysilane, γ-aminopropyltriethoxysilane, γ-mercaptopropyltrimethoxysilane, γ-mercaptopropyltriethoxy-silane, N-(β-aminoethyl)-γ-aminopropyltrimethoxysilane, and β-cyanoethyltrimethoxysilane;

dialkoxysilanes or diacyloxysilanes such as dimethyldimethoxysilane, dimethyldiethoxysilane, dimethyl-di(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyl-diisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, 3,3,3-trifluoropropyl-methyldimethoxysilane, γ-methacryloxypropylmethyldimethoxy-silane, γ-acryloxypropylmethyldimethoxysilane, γ-aminopropylmethyldimethoxysilane, γ-aminopropylmethyldiethoxysilane, γ-mercaptopropylmethyldimethoxysilane, γ-mercaptopropylmethyldiethoxysilane, N-(β-aminoethyl)-γ-aminopropyl-methyldimethoxysilane, and β-cyanoethylmethyldimethoxy-silane; and tetraalkoxysilanes such as methyl silicate, ethyl silicate, n-propyl silicate, n-butyl silicate, sec-butyl silicate, and t-butyl silicate.

(Co-)hydrolyzates of these silane compounds are also useful. These silane compounds and/or (co-)hydrolyzates thereof may be used alone or in admixture of two or more.

The (co-)hydrolyzates of the above silane compounds are obtained, for example, by adding water to a lower alcohol solution of the silane compound(s) in the presence of an acid catalyst. Exemplary lower alcohols are methanol, ethanol, isopropanol and butanol. Solvents compatible with these alcohols include ketones such as acetone and acetylacetone, esters such as ethyl acetate and isobutyl acetate, and ethers such as propylene glycol monomethyl ether, dipropylene glycol monomethyl ether, and diisopropyl ether.

Alternatively, for improving mar resistance, it is preferred to apply a colloidal silica-laden organopolysiloxane composition in which 5 to 70% by weight of colloidal silica (obtained by dispersing silica fines having a particle size of about 1 to 100 mμ in water or an alcohol such as methanol, ethanol, isobutanol or diacetone alcohol) is added to the above organopolysiloxane composition. Also a metal oxide such as titanium oxide, zirconium oxide, tin oxide or tungsten oxide may be added as a UV shielding agent to the above organopolysiloxane composition. Moreover, a curing catalyst may be added in a catalytic amount to the above organopolysiloxane composition. The curing catalyst is selected from quaternary ammonium salts, alkali metal salts of organic acids, alkoxides and chelates of aluminum, titanium, chromium and iron, perchlorates, acid anhydrides, polyamines, and Lewis acids, though not limited thereto.

The coating composition or primer coating composition is useful in protecting surfaces of various articles, especially plastic articles. Specifically the coating composition is applied to an article substrate to form a protective coating thereon. The plastic article substrates to which the composition is applicable include those of polycarbonate, polystyrene, modified acrylic resins, urethane resins, thiourethane resins, polycondensates of halogenated bisphenol A and ethylene glycol, acrylic urethane resins, halogenated aryl group-containing acrylic resins, and sulfur-containing resins. The benefits become more outstanding when the coating composition is applied to transparent plastic substrates, and especially polycarbonate resins.

Coated plastic articles, especially of polycarbonate resins, having coatings of the inventive coating compositions are endowed with improved transparency, mar resistance, weather resistance and chemical resistance. They are suited on outdoor use, for example, as windows and windshields on automobiles, aircraft and other transporting vehicles, building windows, and acoustic barrier walls along highways.

EXAMPLE

Examples of the invention are given below by way of illustration and not by way of limitation. All parts and percents are by weight. The viscosity is at 25° C. Synthesis Examples are first described.

Synthesis of Silyl-modified UV Absorbers

Synthesis Example 1

A 0.5-liter flask equipped with a stirrer, condenser and thermometer was charged with 161.5 g (0.50 mol) of 2-(2'-hydroxy-5'-methacryloxyethylphenyl)-2H-benzotriazole, 89.5 g (0.50 mol) of γ-aminopropyltrimethoxysilane, and 251 g of dimethylformamide, which were stirred and heated at 80° C. for dissolution. At this point, the solution was yellow and clear. The solution was heated to 120° C., at which temperature reaction was effected for 5 hours, obtaining a brown clear solution. By gas chromatography analysis, the disappearance of the reactant, γ-aminopropyltrimethoxysilane was confirmed. The solid concentration was 50.1%. A dilution obtained by diluting the solution with dichloromethane to a solid concentration of 0.05 g/liter was analyzed for absorbance by spectrophotometry, finding an absorbance: λmax 341.4 nm and Abs 1.75, which was substantially identical with the absorbance of the reactant, 2-(2'-hydroxy-5'-methacryloxyethylphenyl)-2H-benzotriazole as analyzed at the same concentration: λmax 342.7 nm and Abs 1.85, with the light absorption waveform of the former being also substantially identical with the latter.

Synthesis Example 2

A 0.5-liter flask equipped with a stirrer, condenser and thermometer was charged with 161.5 g (0.50 mol) of 2-(2'-hydroxy-5'-methacryloxyethylphenyl)-2H-benzotriazole, 111.0 g (0.50 mol) of N-(2-aminoethyl)-3-aminopropyltrimethoxysilane, and 272.5 g of dimethylformamide, which were stirred and heated at 80° C. for dissolution. At this point, the solution was yellow and clear. The solution was heated to 120° C., at which temperature reaction was effected for 4 hours, obtaining a brown clear solution. By gas chromatography analysis, the disappearance of the reactant, N-(2-aminoethyl)-3-aminopropyltrimethoxysilane was confirmed. The solid concentration was 49.9%. A dilution obtained by diluting the solution with dichloromethane to a solid concentration of 0.05 g/liter was analyzed for absorbance by spectrophotometry, finding an absorbance: λmax 339.8 nm and Abs 1.66, which was substantially identical with the absorbance of the reactant, 2-(2'-hydroxy-5'-methacryloxyethylphenyl)-2H-benzotriazole as analyzed at the same concentration: λmax 342.7 nm and Abs 1.85, with the light absorption waveform of the former being also substantially identical with the latter.

Synthesis Example 3

A 1.0-liter flask equipped with a stirrer, condenser and thermometer was charged with 323.0 g (1.0 mol) of 2-(2'-hydroxy-5'-methacryloxyethylphenyl)-2H-benzotriazole, 89.5 g (0.50 mol) of γ-aminopropyltrimethoxysilane, and 412.5 g of dimethylformamide, which were stirred and heated at 80° C. for dissolution. At this point, the solution was yellow and clear. The solution was heated to 120° C., at which temperature reaction was effected for 10 hours, obtaining a brown clear solution. By gas chromatography analysis, the disappearance of the reactant, γ-aminopropyltrimethoxysilane was confirmed. By GPC analysis using standard polystyrene as a reference, the disappearance of the other reactant, 2-(2'-hydroxy-5'-methacryloxyethylphenyl)-2H-benzotriazole was also confirmed. The solid concentration was 51.0%. A dilution obtained by diluting the solution with dichloromethane to a solid concentration of 0.05 g/liter was analyzed for absorbance by spectrophotometry, finding an absorbance: λmax 341.4 nm and Abs 2.22, which was substantially identical with the absorbance of the reactant, 2-(2'-hydroxy-5'-methacryloxyethylphenyl)-2H-benzotriazole as analyzed at the same concentration: λmax 342.7 nm and Abs 1.85, with the light absorption waveform of the former being also substantially identical with the latter.

Synthesis Example 4

A 1.0-liter flask equipped with a stirrer, condenser and thermometer was charged with 323.0 g (1.0 mol) of 2-(2'-hydroxy-5'-methacryloxyethylphenyl)-2H-benzotriazole, 111.0 g (0.50 mol) of N-(2-aminoethyl)-3-aminopropyltrimethoxysilane, and 434.0 g of dimethylformamide, which were stirred and heated at 80° C. for dissolution. At this point, the solution was yellow and clear. The solution was heated to 120° C., at which temperature reaction was effected for 10 hours, obtaining a brown clear solution. By gas chromatography analysis, the disappearance of the reactant, N-(2-aminoethyl)-3-aminopropyltrimethoxysilane was confirmed. By GPC analysis using standard polystyrene as a reference, the disappearance of the other reactant, 2-(2'-hydroxy-5'-methacryloxyethylphenyl)-2H-benzotriazole was also confirmed. The solid concentration was 50.3%. A dilution obtained by diluting the solution with dichloromethane to a solid concentration of 0.05 g/liter was analyzed for absorbance by spectrophotometry, finding an absorbance: λmax 341.5 nm and Abs 2.22, which was substantially identical with the absorbance of the reactant, 2-(2'-hydroxy-5'-methacryloxyethylphenyl)-2H-benzotriazole as analyzed at the same concentration: λmax 342.7 nm and Abs 1.85, with the light absorption waveform of the former being also substantially identical with the latter.

Synthesis of Alkoxysilyl-containing Organic Copolymers

Synthesis Example 5

A 0.5-liter flask equipped with a stirrer, condenser and thermometer was charged with 20 g of γ-methacryloxypropyltrimethoxysilane, 60 g of methyl methacrylate, 5 g of ethyl acrylate, 5 g of vinyl acetate, 10 g of glycidyl methacrylate, 0.2 g of ethylene glycol dimethacrylate, 0.5 g of azobisisobutyronitrile as a polymerization initiator, and 20 g of diacetone alcohol and 80 g of ethylene glycol monomethyl ether as solvents. The contents were stirred for 5 hours at 80 to 90° C. under a nitrogen stream. The resulting solution containing an organic copolymer having alkoxysilyl groups had a viscosity of 43,600 centistokes, and the copolymer contained 20% of alkoxyl groups.

Synthesis Example 6

The procedure of Synthesis Example 5 was repeated except that the amount of γ-methacryloxypropyltrimethoxysilane was changed to 10 g and the amount of methyl methacrylate was changed to 70 g, obtaining a solution containing an organic copolymer having alkoxysilyl groups. The organic copolymer solution had a viscosity of 40,600 centistokes, and the copolymer contained 10% of alkoxyl groups.

Synthesis Example 7

The procedure of Synthesis Example 5 was repeated except that 20 of γ-methacryloxypropyltrimethoxysilane was replaced by 20 g of vinyltrimethoxysilane, obtaining a solution containing an organic copolymer having alkoxysilyl groups. The organic copolymer solution had a viscosity of 39,700 centistokes, and the copolymer contained 20% of alkoxyl groups.

Synthesis of Compounds Containing a Nitrogen Atom and an Alkoxysilyl Group in a Molecule

Synthesis Example 8

A 2.0-liter flask equipped with a stirrer, condenser and thermometer was charged with 222 g of N-2-(aminoethyl)-3-aminopropyltrimethoxysilane and 242 g of hexamethyldisilazane as a silylating agent. The contents were heated at 120° C. under a nitrogen stream. To the flask, 496 g of γ-glycidoxypropylmethyldiethoxysilane was added dropwise for reaction. The reaction mixture was further stirred and heated at 120° C. for 5 hours. A low-boiling fraction was stripped off at 100° C. under vacuum, leaving 862 g of a viscous compound having a viscosity of 1,387 centistokes, a refractive index of 1.4618 and a specific gravity of 1.048.

Next, a 2.0-liter flask equipped with a stirrer, condenser and thermometer was charged with 862 g of the reaction product and 862 g of toluene. In a nitrogen stream, 141 g of acetic anhydride was added dropwise to the flask at room temperature for reaction. The reaction mixture was further stirred and heated at 110° C. for 2 hours. Methanol, 141 g, was added dropwise to the reaction mixture at 50° C., which was further stirred and heated at 50° C. for 1 hour. A low-boiling fraction was stripped off at 100° C. under vacuum, leaving a highly viscous compound.

This compound was analyzed by IR absorption spectroscopy, finding no absorption peaks attributable to the OH or NH group in the region of at least 3,000 cm$^{-1}$, but a definite peak attributable to the amide group absorption at 1,650 cm$^{-1}$.

Synthesis of Colloidal Silica-laden Organopolysiloxane Composition

Synthesis Example 9

A 1.0-liter flask equipped with a stirrer, condenser and thermometer was charged with 164 g of methyltriethoxysilane and 46 g of isobutanol, which were maintained below 5° C. under ice cooling with stirring. To this was added 138 g of colloidal silica (containing 20% of SiO$_2$) below 5° C. The mixture was stirred for 2 hours under ice cooling and for a further 8 hours at 20 to 25° C. Thereafter, 45 g of diacetone alcohol and 50 g of isobutanol were added, 1.5 g of a 10% aqueous solution of sodium propionate was then added, and the resulting mixture was adjusted to pH 6 to 7 with acetic acid. This was adjusted with isobutanol to a nonvolatile content of 17% as measured by JIS K-6833 and ripened for 5 days at room temperature. The resulting colloidal silica-laden organopolysiloxane composition had a viscosity of about 5 centistokes and the nonvolatile component had a number average molecular weight of about 1,000.

Synthesis Example 10

The procedure of Synthesis Example 9 was repeated except that 3.0 g of a 10% aqueous solution of tetramethylammonium benzoate was used instead of the sodium propionate aqueous solution, obtaining a colloidal silica-laden organopolysiloxane composition.

Synthesis Example 11

The procedure of Synthesis Example 10 was repeated except that there was further added 1.8 g of 2,2',4,4'-tetrahydroxybenzophenone (corresponding to 2 parts per 100 parts of the solids of the colloidal silica-laden organopolysiloxane composition), obtaining a colloidal silica-laden organopolysiloxane composition.

Synthesis of Silyl-modified Photo-stabilizer

Synthesis Example 12

A 0.3-liter flask equipped with a stirrer, condenser and thermometer was charged with 100 g (0.5 mol) of 2,2,6,6-tetramethyl-4-allyl-piperidine and 0.13 g of a butanol solution of chloroplatinic acid (2% solution of H$_2$PtCl$_6$·6H$_2$O). To the flask at room temperature, 80.6 g (0.66 mol) of trimethoxysilane was added dropwise over one hour, and reaction effected at 90° C. for 5 hours. At the end of reaction, distillation was effected under vacuum, collecting 126 g of a fraction at 151–154° C. at 7 mmHg. By gas chromatography, 2,2,6,6-tetramethylpiperidino-4-propyltrimethoxysilane was collected at a purity of 97%. Its structure was confirmed by IR spectrometry and proton-NMR analysis.

Synthesis of Alkoxysilyl Group-containing, UV Absorbing Organic Copolymers

Synthesis Example 13

A 2-liter flask equipped with a stirrer, condenser and thermometer was charged with 376.7 g of diacetone alcohol as a solvent, which was heated at 80° C. under a nitrogen stream. To the flask were successively admitted a 90-g portion of a monomer premix consisting of 16.5 g of 2-[2'-hydroxy-5'-(2-methacryloxyethyl)phenyl]-2H-benzotriazole, 54 g of γ-methacryloxypropyltrimethoxysilane, 216 g of methyl methacrylate, 16.9 g of ethyl acrylate, 16.9 g of vinyl acetate, and 33.8 g of glycidyl methacrylate, and a 36-g portion of a solution of 2.3 g of 2,2'-azobis(2-methylbutyronitrile) as a polymerization initiator in 177.7 g of diacetone alcohol. Reaction was effected at 80° C. for 30 minutes, following which the remainder of the monomer premix and the remainder of the polymerization initiator solution were simultaneously added dropwise at 80 to 90° C. over 1.5 hours. Stirring was continued for a further 5 hours at 80 to 90° C.

The resulting solution of alkoxysilyl group-containing, UV absorbing organic copolymer had a viscosity of 14,000 centipoise. The copolymer had a UV-absorbing monomer content of 4.7% and an alkoxyl group-containing monomer content of 15.2%. It had a weight average molecular weight of 105,000 on GPC analysis using standard polystyrene as a reference.

Synthesis Example 14

A solution of alkoxysilyl group-containing, UV absorbing organic copolymer was prepared as in Synthesis Example 13 except that 376.7 g of diacetone alcohol as the solvent was changed to 385.4 g, 16.5 g of 2-[2'-hydroxy-5'-(2-methacryloxyethyl)phenyl]-2H-benzotriazole as the monomer was changed to 35 g, and 2.8 g of 1,2,2,6,6-pentamethyl-4-piperidinyl methacrylate was used as an additional monomer.

The resulting copolymer solution had a viscosity of 7,500 centipoise. The copolymer had a UV-absorbing monomer content of 9.3% and an alkoxyl group-containing monomer content of 14.3%. It had a weight average molecular weight of 96,400 on GPC analysis using standard polystyrene as a reference.

Synthesis Example 15

A 2-liter flask equipped with a stirrer, condenser and thermometer was charged with 471.3 g of diacetone alcohol as a solvent and 55.2 g of 2-[2'-hydroxy-5'-(2-methacryloxyethyl)phenyl]-2H-benzotriazole, which were heated at 80° C. under a nitrogen stream. To the flask were successively admitted a 90-g portion of a monomer premix consisting of 40.0 g of 2-[2'-hydroxy-5'-(2-methacryloxyethyl)phenyl]-2H-benzotriazole, 54 g of γ-methacryloxypropyltrimethoxysilane, 216 g of methyl methacrylate, 16.9 g of ethyl acrylate, 16.9 g of vinyl acetate, 33.8 g of glycidyl methacrylate, and 2.8 g of 1,2,2,6,6-pentamethyl-4-piperidinyl methacrylate, and a 36-g portion of a solution of 2.3 g of 2,2'-azobis(2-methylbutyronitrile) as a polymerization initiator in 177.7 g of diacetone alcohol. Reaction was effected at 80° C. for 30 minutes, following which the remainder of the monomer premix and the remainder of the polymerization initiator solution were simultaneously added dropwise at 80 to 90° C. over 1.5 hours. Stirring was continued for a further 5 hours at 80 to 90° C.

The resulting solution of alkoxysilyl group-containing, UV absorbing organic copolymer had a viscosity of 10,700 centipoise. The copolymer had a UV-absorbing monomer content of 22.0% and an alkoxyl group-containing monomer content of 12.3%. It had a weight average molecular weight of 58,000 on GPC analysis using standard polystyrene as a reference.

Synthesis Example 16

A solution of alkoxysilyl group-containing, UV absorbing organic copolymer was prepared as in Synthesis Example 13 except that 16.5 g of 2-[2'-hydroxy-5'-(2-methacryloxyethyl)phenyl]-2H-benzotriazole as the monomer was changed to 0.2 g, and 216 g of methyl methacrylate was changed to 232.3 g.

The resulting copolymer solution had a viscosity of 13,200 centipoise. The copolymer had a UV-absorbing monomer content of 0.06% and an alkoxyl group-containing monomer content of 15.2%. It had a weight average molecular weight of 99,900 on GPC analysis using standard polystyrene as a reference.

Synthesis Example 17

A solution of alkoxysilyl group-containing, UV absorbing organic copolymer was prepared as in Synthesis Example 13 except that 16.5 g of 2-[2'-hydroxy-5'-(2-methacryloxyethyl)phenyl]-2H-benzotriazole as the monomer was changed to 194.8 g, and 216 g of methyl methacrylate was changed to 37.7 g. The monomer premix then became slurry because 2-[2'-hydroxy-5'-(2-methacryloxyethyl)phenyl]-2H-benzotriazole was not fully dissolved.

The resulting copolymer solution had a viscosity of 3,400 centipoise. The copolymer had a UV-absorbing monomer content of 55.0% and an alkoxyl group-containing monomer content of 15.2%. It had a weight average molecular weight of 32,000 on GPC analysis using standard polystyrene as a reference.

Synthesis Example 18

A solution of UV absorbing organic copolymer was prepared as in Synthesis Example 13 except that 54 g of γ-methacryloxypropyltrimethoxysilane was omitted, and 216 g of methyl methacrylate was changed to 270 g.

The resulting copolymer solution had a viscosity of 38,000 centipoise. The copolymer had a UV-absorbing monomer content of 4.7% and an alkoxyl group-containing monomer content of 0%. It had a weight average molecular weight of 94,000 on GPC analysis using standard polystyrene as a reference.

Now, Examples of the invention are given together with Comparative Examples. The abbreviations for UV absorbers, microparticulate inorganic oxides, hindered amine photo-stabilizers, and organic copolymers used herein have the following meaning.

UV Absorbers
UVA-1: reaction product of Synthesis Example 1
UVA-2: reaction product of Synthesis Example 2
UVA-3: reaction product of Synthesis Example 3
UVA-4: reaction product of Synthesis Example 4
UVA-5: 2,2',4,4'-tetrahydroxybenzophenone
UVA-6: 2,4-dihydroxybenzophenone
UVA-7: 2-(3,5-di-t-butyl-2-hydroxyphenyl)-5-chlorobenzotriazole
UVA-8: 2-(2-hydroxy-4-hexyloxyphenyl)-4,6-diphenyltriazine
UVA-9: a copolymer of 2-(2'-hydroxy-5'-methacryloxyethyl-phenyl)-2H-benzotriazole (30%) and methyl methacrylate (70%)
UVA-10: a copolymer of 2-(2'-hydroxy-5'-methacryloxyethyl-phenyl)-2H-benzotriazole (30%) and styrene (70%)

Microparticulate Inorganic Oxides
UV-1: titanium oxide sol (20% methanol dispersion of $TiO_2$ with a mean particle size of 20 mμ)
UV-2: surface treated titanium oxide sol (20% methanol dispersion of titania particles surface coated with $SiO_2$, containing 85% $TiO_2$, and having a mean particle size of 20 mμ)
UV-3: microparticulate compound oxide sol (20% methanol dispersion of mixed compound titanium oxide having an average composition: $TiO_2/ZrO_2/SiO_2$=70/8/22 and having a mean particle size of 20 mμ)
UV-4: cerium oxide sol (20% methanol dispersion of $CeO_2$ with a mean particle size of 20 mμ)
UV-5: surface treated zinc oxide sol (20% methanol dispersion of zinc oxide particles surface treated with 15% silica and having a mean particle size of 20 mμ)
UV-6: silica sol (20% methanol dispersion of $SiO_2$ with a mean particle size of 20 mμ)

Hindered Amine Photo-stabilizers
HALS-1: N-acetyl-3-dodecyl-1-(2,2,6,6-tetramethyl-4-piperidinyl)pyrrolidine-2,5-dione
HALS-2: a condensate of 1,2,3,4-butanetetracarboxylic acid, 2,2,6,6-tetramethyl-piperidinol and tridecanol
HALS-3: 2,2,6,6-tetramethylpiperidino-4-propyltrimethoxy-silane synthesized in Synthesis Example 12

Alkoxysilyl Group-containing Organic Copolymers
Pol-1: the reaction product of Synthetic Example 5
Pol-2: the reaction product of Synthetic Example 6
Pol-3: the reaction product of Synthetic Example 7

Compounds Containing Nitrogen and Alkoxysilyl Group in Molecule
NSi-1: ureidopropyltriethoxysilane
NSi-2: the reaction product of Synthetic Example 8

Colloidal Silica-laden Organopolysiloxane Compositions
HC-1: colloidal silica-laden organopolysiloxane composition of Synthetic Example 9
HC-2: colloidal silica-laden organopolysiloxane composition of Synthetic Example 10
HC-3: colloidal silica-laden organopolysiloxane composition of Synthetic Example 11

Alkoxysilyl Group-containing, UV Absorbing Organic Copolymers
Pol-13: the reaction product of Synthetic Example 13
Pol-14: the reaction product of Synthetic Example 14
Pol-15: the reaction product of Synthetic Example 15
Pol-16: the reaction product of Synthetic Example 16
Pol-17: the reaction product of Synthetic Example 17
Pol-18: the reaction product of Synthetic Example 18

In Examples, physical properties were measured and rated by the following procedures.

(1) Weathering Test

An accelerated weathering test was carried out by a carbon arc sunshine weatherometer according to JIS K-5400. After 5,000 hours, a yellowing factor and adhesion were examined according to JIS K-7103. Those samples having a yellowing factor of up to 7 and good adhesion were rated "Passed."

(2) Marring Test

Using a Taber abrader equipped with an abrasive wheel CS-10F, a sample was rotated under a load of 500 g according to ASTM 1044. After 1,000 revolutions, the sample was measured for haze. A Taber abrasion (%) was calculated as the haze after test minus the haze prior to test.

(3) Adhesion of Cured Film

An adhesive tape test was carried out according to JIS K-5400 by scribing a sample with a razor along eleven spaced 1-mm apart orthogonal lines to define 100 square sections in the coating, closely applying a commercially available adhesive tape thereto, and quickly peeling the adhesive tape by an angle of 90 degrees. The number (X) of remaining (not peeled) coating sections is expressed as X/100.

Example and Comparative Example I (1) Preparation of Primer Coating Composition

Primer coating compositions (a) to (z) were prepared according to the formulation shown in Tables 1 to 3 by mixing the organic copolymer (Pol-1 to 3) prepared in Synthetic Examples 5 to 7, polymethyl methacrylate having an average molecular weight of 150,000, the compound containing nitrogen and alkoxysilyl group in molecule (NSi-1, 2), the silyl-modified UV absorber (UVA-1 to 4) prepared in Synthetic Examples 1 to 4, the UV absorber (UVA-5 to 10), and the photo-stabilizer (HALS-1 to 3), and diluting the mixture with a 20/80 mixture of diacetone alcohol and ethylene glycol monomethyl ether to a concentration of 10% organic copolymer solids.

(2) Preparation of Coating Composition

Coating compositions (A) to (Z) were prepared according to the formulation shown in Tables 4 to 6 by mixing the colloidal silica-laden organopolysiloxane composition (HC-1 to 3) prepared in Synthetic Examples 9 to 11, the silyl-modified UV absorber (UVA-1 to 4) prepared in Synthetic Examples 1 to 4, the UV absorber (UVA-5 to 10), and the microparticulate inorganic oxide (UV-1 to 6).

It is noted that the following procedure was employed when the silyl-modified UV absorber was incorporated in the colloidal silica-laden organopolysiloxane composition from the first. The resulting compositions are designated UVA-11 to 14. In these cases, HC-1 to 3 were not separately used.

Preparation Procedure

A 1.0-liter flask equipped with a stirrer, condenser and thermometer was charged with 164 g of methyltriethoxysilane, 19.7 g of UVA-1, and 46 g of isobutanol, which were maintained below 5° C. under ice cooling while stirring. To the flask, 138 g of water-dispersed colloidal silica (containing 20% of $SiO_2$) below 5° C. was added. The contents were stirred for 2 hours under ice cooling and for 8 hours at 20 to 25° C., following which 45 g of diacetone alcohol and 50 g of isobutanol were added. Thereafter, 1.5 g of a 10% aqueous solution of sodium propionate was added to the reaction solution, which was adjusted to pH 6 to 7 with acetic acid. This was diluted with isobutanol so as to give a nonvolatile concentration of 19% as measured according to JIS K-6833. Ripening for 5 days at room temperature yielded a silane hydrolyzate solution having a viscosity of about 5 centistokes and the nonvolatile matter had a number average molecular weight of about 1,000. This is designated UVA-11.

UVA-12 was prepared by substituting UVA-2 for UVA-1.
UVA-13 was prepared by substituting UVA-3 for UVA-1.
UVA-14 was prepared by substituting UVA-4 for UVA-1.

(3) Preparation of Surface-coated Part

The primer coating composition, if used, was applied onto a cleaned surface of a polycarbonate resin sheet of 0.5 mm thick by the flow coating method and cured at about 120° C. for about 30 minutes, obtaining a cured primer coating of 2 to 5 μm thick. The colloidal silica-laden organopolysiloxane coating composition obtained in above (2) was applied onto the primer coating by the flow coating method and cured at about 120° C. for about one hour, obtaining a cured coating of 2 to 5 μm thick. In the event of omitting the primer, the colloidal silica-laden organopolysiloxane coating composition was applied onto a cleaned surface of a polycarbonate resin sheet of 0.5 mm thick by the flow coating method and cured at about 120° C. for about one hour, obtaining a cured coating of 2 to 5 μm thick. The thus surface-coated sheets were examined for physical properties, with the results shown in Table 7.

TABLE 1

| Primer | Primer coating composition (Examples) | | | | | | | | |
|---|---|---|---|---|---|---|---|---|---|
| designation | a | b | c | d | e | f | g | h | i |
| UVA | UVA-1 (20 parts) | UVA-1 (30 parts) | UVA-1 (40 parts) | UVA-2 (30 parts) | UVA-3 (30 parts) | UVA-4 (30 parts) | UVA-1 (30 parts) | UVA-1 (30 parts) | UVA-1 (30 parts) |
| Organic copolymer | Pol-1 (100 parts) | Pol-1 (100 parts) | Pol-1 (100 parts) | Pol-2 (100 parts) | Pol-3 (100 parts) | Pol-1 (100 parts) | Pol-1 (100 parts) | Pol-1 (100 parts) | Pol-1 (100 parts) |
| Polymethyl methacrylate | — | — | — | — | — | — | 20 parts | 20 parts | 20 parts |
| Nsi | — | — | — | — | — | — | — | NSi-1 (5 parts) | NSi-2 (20 parts) |
| HALS | — | — | — | — | — | — | — | — | HALS-1 (10 parts) |

TABLE 2

| Primer designation | Primer coating composition (Examples) | | | | | | | |
|---|---|---|---|---|---|---|---|---|
| | j | k | l | m | n | o | p | q |
| UVA | UVA-1 (30 parts) | UVA-1 (30 parts) | UVA-1 (30 parts) | UVA-1 (27 parts) + UVA-5 (3 parts) | UVA-1 (27 parts) + UVA-7 (3 parts) | UVA-1 (27 parts) + UVA-8 (3 parts) | UVA-1 (27 parts) + UVA-9 (3 parts) | UVA-1 (27 parts) + UVA-10 (3 parts) |
| Organic copolymer | Pol-1 (100 parts) | Pol-1 (100 parts) | Pol-2 (100 parts) | Pol-1 (100 parts) | Pol-1 (100 parts) | Pol-1 (100 parts) | Pol-1 (100 parts) | Pol-1 (100 parts) |
| Polymethyl methacrylate | 20 parts | 20 parts | 20 parts | — | — | — | 20 parts | — |
| Nsi | NSi-1 (5 parts) | NSi-2 (20 parts) | NSi-2 (30 parts) | NSi-2 (20 parts) | NSi-2 (20 parts) | NSi-2 (20 parts) | NSi-2 (20 parts) | NSi-2 (20 parts) |
| HALS | HALS-2 (10 parts) | HALS-3 (6 parts) | HALS-3 (6 parts) | HALS-1 (3 parts) | HALS-3 (10 parts) | HALS-3 (6 parts) | HALS-1 (2 parts) | HALS-1 (2 parts) |

TABLE 3

| Primer designation | Primer coating composition (Comparative Examples) | | | | | | | | |
|---|---|---|---|---|---|---|---|---|---|
| | r | s | t | u | v | w | x | y | z |
| UVA | UVA-5 (10 parts) | UVA-5 (20 parts) | UVA-5 (10 parts) | UVA-6 (20 parts) | UVA-8 (20 parts) | UVA-9 (20 parts) | UVA-10 (20 parts) | UVA-10 (20 parts) | UVA-6 (20 parts) |
| Organic copolymer | Pol-1 (100 parts) | Pol-1 (100 parts) | Pol-1 (100 parts) | Pol-2 (100 parts) | Pol-3 (100 parts) | Pol-1 (100 parts) | Pol-1 (100 parts) | Pol-2 (100 parts) | Pol-1 (100 parts) |
| Polymethyl methacrylate | — | — | — | — | — | — | — | — | 20 parts |
| Nsi | — | — | — | — | — | — | — | — | NSi-2 (20 parts) |
| HALS | — | — | HALS-2 (3 parts) | — | — | HALS-3 (3 parts) | — | — | HALS-2 (1 part) |

TABLE 4

| Coating composition designation | Coating composition (Examples) | | | | | | | | |
|---|---|---|---|---|---|---|---|---|---|
| | A | B | C | D | E | F | G | H | I |
| Collodial silica-laden organopoly-siloxane (as solids) | HC-1 (100 parts) | HC-2 (100 parts) | HC-1 (100 parts) | HC-1 (100 parts) | HC-3 (100 parts) | HC-1 (100 parts) | HC-1 (100 parts) | HC-1 (100 parts) | HC-1 (100 parts) |
| UVA | UVA-1 (10 parts) | UVA-2 (10 parts) | UVA-3 (10 parts) | UVA-4 (10 parts) | UVA-1 (10 parts) | UVA-1 (10 parts) | UVA-1 (10 parts) | UVA-1 (10 parts) | UVA-1 (10 parts) |
| UV | — | — | — | — | — | UV-1 (20 parts) | UV-2 (20 parts) | UV-3 (20 parts) | UV-4 (20 parts) |
| HALS | — | — | — | — | — | — | — | — | — |

TABLE 5

| Coating composition designation | Coating composition (Examples) | | | | | | | |
|---|---|---|---|---|---|---|---|---|
| | J | K | L | M | N | O | P | Q |
| Collodial silica-laden organopoly-siloxane (as solids) | HC-1 (100 parts) | HC-1 (100 parts) | HC-1 (100 parts) | HC-1 (100 parts) | — | — | — | — |
| UVA | UVA-1 (10 parts) | UVA-1 (10 parts) | UVA-1 (30 parts) | UVA-1 (10 parts) | UVA-11 (100 parts) | UVA-12 (100 parts) | UVA-13 (100 parts) | UVA-14 (100 parts) |
| UV | UV-5 (20 parts) | UV-6 (20 parts) | — | — | — | — | — | — |

TABLE 5-continued

| Coating composition designation | Coating composition (Examples) | | | | | | |
|---|---|---|---|---|---|---|---|
| | J | K | L | M | N | O | P | Q |
| HALS | — | — | — | HALS-3 (3 parts) | — | — | — | — |

TABLE 6

| Coating composition designation | Coating composition (Comparative Examples) | | | | | | | | |
|---|---|---|---|---|---|---|---|---|---|
| | R | S | T | U | V | W | X | Y | Z |
| Collodial silica-laden organopoly-siloxane (as solids) | HC-1 (100 parts) | HC-1 (100 parts) | HC-1 (100 parts) | HC-1 (100 parts) | HC-3 (100 parts) | HC-1 (100 parts) | HC-1 (100 parts) | HC-1 (100 parts) | HC-1 (100 parts) |
| UVA | UVA-5 (10 parts) | UVA-6 (10 parts) | UVA-7 (10 parts) | UVA-8 (10 parts) | UVA-9 (10 parts) | UVA-10 (10 parts) | UVA-5 (10 parts) | UVA-5 (30 parts) | UVA-5 (10 parts) |
| UV | — | — | — | — | — | — | UV-1 (20 parts) | UV-4 (20 parts) | UV-1 (20 parts) |
| HALS | — | — | — | — | — | — | — | — | HALS-3 (3 parts) |

TABLE 7

| | Primer | Coating composition | Initial | | Weathering | |
|---|---|---|---|---|---|---|
| | | | Yellowing factor | Taber abrasion | Yellowing factor | Adhesion |
| E1 | a | A | 1.0 | 7 | 1.5 | 100/100 |
| E2 | b | B | 1.2 | 7 | 2.0 | 100/100 |
| E3 | c | C | 1.2 | 7 | 2.5 | 100/100 |
| E4 | d | D | 1.0 | 7 | 2.0 | 100/100 |
| E5 | e | E | 1.4 | 8 | 2.5 | 100/100 |
| E6 | f | F | 1.4 | 7 | 3.0 | 100/100 |
| E7 | g | G | 1.0 | 8 | 2.5 | 100/100 |
| E8 | h | H | 1.0 | 8 | 2.5 | 100/100 |
| E9 | i | I | 1.0 | 7 | 2.0 | 100/100 |
| E10 | j | J | 1.0 | 8 | 2.0 | 100/100 |
| E11 | k | K | 1.5 | 7 | 2.5 | 100/100 |
| E12 | l | L | 1.5 | 8 | 2.0 | 100/100 |
| E13 | m | M | 1.5 | 9 | 3.0 | 100/100 |
| E14 | n | N | 1.5 | 9 | 3.0 | 100/100 |
| E15 | o | O | 1.2 | 9 | 3.0 | 100/100 |
| E16 | p | P | 1.2 | 9 | 3.0 | 100/100 |
| E17 | q | Q | 1.2 | 9 | 3.0 | 100/100 |
| E18 | — | A | 1.0 | 8 | 2.5 | 100/100 |
| E19 | — | F | 1.0 | 8 | 2.5 | 100/100 |
| E20 | — | I | 1.0 | 8 | 2.0 | 100/100 |
| E21 | — | M | 1.0 | 9 | 1.5 | 100/100 |
| E22 | — | N | 1.0 | 8 | 1.5 | 100/100 |
| E23 | a | HC-1 | 1.0 | 8 | 1.5 | 100/100 |
| E24 | c | HC-3 | 1.2 | 8 | 2.0 | 100/100 |
| E25 | j | HC-1 | 1.0 | 9 | 1.5 | 100/100 |
| E26 | l | HC-3 | 1.0 | 8 | 2.0 | 100/100 |
| E27 | m | HC-3 | 1.0 | 7 | 1.5 | 100/100 |
| CE1 | r | R | 3.5 | 10 | 15 | 0/100 |
| CE2 | s | S | 7.5 | 15 | 30 | 0/100 |
| CE3 | t | T | 2.5 | 15 | 10 | 0/100 |
| CE4 | u | U | 5.0 | 20 | 35 | 0/100 |
| CE5 | v | V | 2.0 | 15 | 10 | 50/100 |
| CE6 | w | W | 2.0 | 15 | 10 | 50/100 |
| CE7 | x | X | 2.0 | 20 | 10 | 50/100 |
| CE8 | y | Y | 2.0 | 20 | 10 | 50/100 |
| CE9 | z | Z | 8.0 | 15 | 30 | 0/100 |
| CE10 | — | X | 9.0 | 20 | 25 | 0/100 |
| CE11 | s | HC-1 | 2.0 | 10 | 20 | 50/100 |
| CE12 | w | HC-3 | 2.0 | 10 | 25 | 0/100 |
| CE13 | z | HC-1 | 2.0 | 10 | 20 | 50/100 |

Example and Comparative Example II

Primer coating compositions (A) to (V) were prepared according to the formulation shown in Tables 8 to 11 by mixing the alkoxysilyl group-containing, UV absorbing organic copolymer (Pol-13 to 18) prepared in Synthetic Examples 13 to 18, polymethyl methacrylate having an average molecular weight of 150,000, the compound containing nitrogen and alkoxysilyl group in molecule (NSi-1, 2), the UV absorber (UVA-5 to 10), and the photo-stabilizer (HALS-1 to 3), and diluting the mixture with a 20/80 mixture of diacetone alcohol and ethylene glycol monomethyl ether to a concentration of 10% organic copolymer solids.

The primer coating composition was applied onto a cleaned surface of a polycarbonate resin sheet of 0.5 mm thick by the flow coating method and cured at about 120° C. for about 30 minutes, obtaining a cured primer coating of 0.5 to 20 μm thick. The colloidal silica-laden organopoly-siloxane coating composition each obtained in Synthetic Examples 8 to 10 was applied onto the primer coating by the flow coating method and cured at about 120° C. for about one hour, obtaining a cured coating of 0.5 to 20 μm thick. The thus surface-coated sheets were examined for physical properties, with the results shown in Table 12.

TABLE 8

| | Primer coating composition (Examples) | | | | | |
|---|---|---|---|---|---|---|
| | 28 | 29 | 30 | 31 | 32 | 33 |
| Primer designation | A | B | C | D | E | F |
| UVA | — | — | — | — | — | — |
| Organic copolymer | Pol-1 (100 parts) | Pol-2 (100 parts) | Pol-3 (100 parts) | Pol-1 (100 parts) | Pol-1 (100 parts) | Pol-1 (100 parts) |
| Polymethyl methacrylate | — | — | — | — | 20 parts | 20 parts |
| NSi | — | — | — | — | NSi-1 (5 parts) | NSi-2 (20 parts) |
| HALS | — | — | — | — | HALS-1 (10 parts) | HALS-2 (10 parts) |
| Colloidal silica-laden organopolysiloxane | HC-1 | HC-1 | HC-1 | HC-2 | HC-1 | HC-1 |

TABLE 9

| | Primer coating composition (Examples) | | | | | |
|---|---|---|---|---|---|---|
| | 34 | 35 | 36 | 37 | 38 | 39 |
| Primer designation | G | H | I | J | K | L |
| UVA | — | UVA-5 (3 parts) | UVA-7 (3 parts) | UVA-8 (3 parts) | UVA-9 (3 parts) | UVA-10 (3 parts) |
| Organic copolymer | Pol-2 (100 parts) | Pol-1 (100 parts) | Pol-1 (100 parts) | Pol-1 (100 parts) | Pol-1 (100 parts) | Pol-1 (100 parts) |
| Polymethyl methacrylate | 20 parts | — | — | — | 20 parts | — |
| NSi | NSi-2 (30 parts) | NSi-2 (20 parts) | NSi-2 (20 parts) | NSi-2 (20 parts) | NSi-2 (20 parts) | NSi-2 (20 parts) |
| HALS | HALS-3 (6 parts) | HALS-1 (3 parts) | HALS-3 (10 parts) | HALS-3 (6 parts) | HALS-1 (2 parts) | HALS-1 (2 parts) |
| Colloidal silica-laden organopolysiloxene | HC-3 | HC-3 | HC-3 | HC-3 | HC-3 | HC-3 |

TABLE 10

| | Primer coating composition (Comparative Examples) | | | | | |
|---|---|---|---|---|---|---|
| | 14 | 15 | 16 | 17 | 18 | 19 |
| Primer designation | M | N | O | P | Q | R |
| UVA | — | UVA-5 (20 parts) | UVA-7 (20 parts) | UVA-8 (20 parts) | UVA-9 (20 parts) | UVA-10 (20 parts) |
| Organic copolymer | Pol-4 (100 parts) | Pol-4 (100 parts) | Pol-4 (100 parts) | Pol-4 (100 parts) | Pol-4 (100 parts) | Pol-4 (100 parts) |
| Polymethyl methacrylate | — | — | — | — | — | — |
| Nsi | — | — | — | — | — | — |
| HALS | — | — | — | — | — | — |
| Colloidal Silica-laden organopolysiloxane | HC-1 | HC-1 | HC-1 | HC-1 | HC-1 | HC-1 |

TABLE 11

| | primer coating composition (Comparative Examples) | | | |
|---|---|---|---|---|
| | 20 | 21 | 22 | 23 |
| Primer designation | S | T | U | V |
| UVA | UVA-5 (20 parts) | — | UVA-7 (20 parts) | — |
| Organic copolymer | Pol-4 (100 parts) | Pol-5 (100 parts) | Pol-5 (100 parts) | Pol-6 (100 parts) |
| Polymethyl metbacrylate | 20 parts | — | 20 parts | — |
| NSi | NSi-2 (20 parts) | — | NSi-2 (20 parts) | — |

TABLE 11-continued

|  | primer coating composition (Comparative Examples) | | | |
|---|---|---|---|---|
|  | 20 | 21 | 22 | 23 |
| Primer designation | S | T | U | V |
| HALS | HALS-2 (1 part) | — | HALS-2 (1 part) | — |
| Colloidal silica-laden organopolysiloxane | HC-1 | HC-2 | HC-2 | HC-2 |

TABLE 12

|  | Initial | | Weathering | |
|---|---|---|---|---|
|  | Yellowing factor | Taber abrasion | Yellowing factor | Adhesion |
| E28 | 1.0 | 7 | 2.0 | 100/100 |
| E29 | 1.5 | 7 | 2.0 | 100/100 |
| E30 | 1.5 | 8 | 1.5 | 100/100 |
| E31 | 1.0 | 8 | 2.0 | 100/100 |
| E32 | 1.5 | 7 | 2.5 | 100/100 |
| E33 | 1.0 | 7 | 2.0 | 100/100 |
| E34 | 1.0 | 8 | 2.0 | 100/100 |
| E35 | 3.0 | 9 | 2.0 | 100/100 |
| E36 | 1.0 | 8 | 2.0 | 100/100 |
| E37 | 2.5 | 9 | 2.5 | 100/100 |
| E38 | 1.0 | 8 | 2.0 | 100/100 |
| E39 | 1.0 | 8 | 1.0 | 100/100 |
| CE14 | 1.0 | 9 | 35.0 | 100/100 |
| CE15 | 4.0 | 20 | 15.0 | 0/100 |
| CE16 | 1.5 | 15 | 8.0 | 0/100 |
| CE17 | 3.0 | 11 | 20.0 | 100/100 |
| CE18 | 1.5 | 10 | 10.0 | 100/100 |
| CE19 | 1.5 | 12 | 13.0 | 100/100 |
| CE20 | 1.5 | 8 | 9.0 | 100/100 |
| CE21 | 1.0 | 16 | 4.0 | 0/100 |
| CE22 | 1.5 | 18 | 4.0 | 50/100 |
| CE23 | 1.0 | 20 | 10.0 | 0/100 |

Japanese Patent Application Nos. 2000-027713 and 2000-027719 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A primer coating composition comprising:
an alkoxy group-containing organic copolymer obtained by polymerizing monomer units comprising (I) a UV-absorbing benzotriazole based vinyl monomer, (II) an alkoxysilyl group-containing vinyl monomer, and (III) another copolymerizable monomer, wherein the alkoxysilyl group-containing vinyl monomer accounts for 0.1 to 50% by weight of the copolymer; and
0.1 to 50 parts by weight of a compound obtained by reacting an amino group-containing alkoxysilane with an epoxy group-containing alkoxysilane and a silylating agent and amidating the reaction product thereof, per 100 parts by weight of said organic copolymer.

2. The primer coating composition of claim 1, further comprising 0.1 to 10 parts by weight of a photo-stabilizer having at least one cyclic hindered amine structure in a molecule, per 100 parts by weight of said organic copolymer.

3. The primer coating composition of claim 2 wherein said copolymer contains 0.1 to 10% by weight of an acrylic monomer having a cyclic hindered amine base photo-stabilizing group as the other monomer (III).

4. The primer coating composition of claim 1 wherein the reaction product of the amino group-containing alkoxysilane and the epoxy group-containing alkoxysilane is obtained by using said alkoxysilanes in an amount that the molar ratio of epoxy groups to amino groups ranges from 0.3/1 to 1.2/1.

5. A method for coating a plastic substrate with a weather and abrasion-resistant coating, comprising the steps of:
(i) applying an organic solvent solution of the primer coating composition of any one of claims 1 to 3 onto a plastic substrate,
(ii) evaporating the organic solvent and curing the primer coating,
(iii) applying an organopolysiloxane composition onto the primer coat, said organopolysiloxane composition comprising a hydrolyzate or co-hydrolyzate of an organoxysilane of the following general formula (D):

wherein $R^{14}$ is selected from the class consisting of a alkyl group, aryl group, halogenated alkyl group, halogenated aryl group and alkenyl group of 1 to 10 carbon atoms, and an organic group having an epoxy, (meth)acryloxy, mercapto, amino or cyano group, $R^{15}$ is hydrogen or an organic group of 1 to 10 carbon atoms, and x is equal to 0, 1 or 2, and
(iv) heating the coating of the organopolysiloxane composition for curing.

6. The method of claim 5 wherein said organopolysiloxane composition further contains colloidal silica.

7. The method of claim 5 wherein the plastic substrate is comprised of a polycarbonate resin.

8. The method of claim 7 wherein the polycarbonate resin is transparent.

* * * * *